United States Patent
Elyasi et al.

(10) Patent No.: US 11,500,752 B2
(45) Date of Patent: *Nov. 15, 2022

(54) MULTI-NON-VOLATILE MEMORY SOLID STATE DRIVE BLOCK-LEVEL FAILURE PREDICTION WITH SEPARATE LOG PER NON-VOLATILE MEMORY

(71) Applicant: Samsung Electronics Co., Ltd., Suwon-si (KR)

(72) Inventors: Nima Elyasi, San Jose, CA (US); Changho Choi, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/093,620

(22) Filed: Nov. 9, 2020

(65) Prior Publication Data
US 2022/0066683 A1    Mar. 3, 2022

Related U.S. Application Data

(60) Provisional application No. 63/076,370, filed on Sep. 9, 2020, provisional application No. 63/073,923, filed
(Continued)

(51) Int. Cl.
| | |
|---|---|
| *G06F 11/30* | (2006.01) |
| *G06F 11/07* | (2006.01) |
| *G06F 3/06* | (2006.01) |

(52) U.S. Cl.
CPC .......... *G06F 11/3034* (2013.01); *G06F 3/064* (2013.01); *G06F 3/0619* (2013.01);
(Continued)

(58) Field of Classification Search
CPC ............... G06F 11/3034; G06F 11/076; G06F 11/0772; G06F 3/0619; G06F 3/064;
(Continued)

(56) References Cited

U.S. PATENT DOCUMENTS

| | | |
|---|---|---|
| 7,954,004 B2 | 5/2011 | Li |
| 8,176,367 B2 | 5/2012 | Dreifus et al. |
| | (Continued) | |

FOREIGN PATENT DOCUMENTS

| | | |
|---|---|---|
| CN | 109830254 A | 5/2019 |
| JP | 6386523 B2 | 9/2018 |
| | (Continued) | |

OTHER PUBLICATIONS

Office Action for U.S. Appl. No. 16/701,133, dated Mar. 24, 2021.
(Continued)

*Primary Examiner* — Hiep T Nguyen
(74) *Attorney, Agent, or Firm* — Renaissance IP Law Group LLP

(57) ABSTRACT

A storage device is disclosed. A first storage media may store data. The first storage media may be of a first storage type and may be organized into at least two blocks. A second storage media may also store data. The second storage media may be of a second storage type different from the first type, and may also be organized into at least two blocks. A controller may manage reading data from and writing data to the first storage media and the second storage media. Metadata storage may store device-based log data for errors in the storage device. The drive-based log data may include a first log data for the first storage media and a second log data for the second storage media. An identification circuit may identify a suspect block in the at least two blocks in the first storage media and the second storage media, responsive to the device-based log data.

20 Claims, 17 Drawing Sheets

Related U.S. Application Data on Sep. 2, 2020, provisional application No. 63/073,926, filed on Sep. 2, 2020.

(52) U.S. Cl.
CPC .......... *G06F 3/0655* (2013.01); *G06F 3/0659* (2013.01); *G06F 3/0673* (2013.01); *G06F 3/0679* (2013.01); *G06F 11/076* (2013.01); *G06F 11/0772* (2013.01)

(58) Field of Classification Search
CPC .... G06F 3/0655; G06F 3/0659; G06F 3/0673; G06F 3/0679
See application file for complete search history.

(56) References Cited

U.S. PATENT DOCUMENTS

| | | |
|---|---|---|
| 8,214,333 B2 | 7/2012 | Kawakami et al. |
| 8,489,979 B2 | 7/2013 | Rub |
| 8,806,106 B2 | 8/2014 | Goss et al. |
| 9,123,422 B2 | 9/2015 | Yu et al. |
| 9,176,862 B2 | 11/2015 | Chen et al. |
| 9,251,019 B2 | 2/2016 | Losh et al. |
| 9,349,476 B2 | 5/2016 | Pe'er |
| 9,423,970 B2 | 8/2016 | Darragh |
| 9,547,589 B2 | 1/2017 | Yu et al. |
| 9,569,120 B2 | 2/2017 | Ryan et al. |
| 9,632,854 B2 | 4/2017 | Helgeson et al. |
| 9,779,015 B1 | 10/2017 | Oikarinen et al. |
| 9,864,525 B2 | 1/2018 | Kankani et al. |
| 9,891,844 B2 | 2/2018 | Kankani et al. |
| 9,971,537 B1 | 5/2018 | Kannan et al. |
| 10,223,029 B2 | 3/2019 | Gorobets et al. |
| 10,346,232 B2 | 7/2019 | Shulkin et al. |
| 2011/0063918 A1 | 3/2011 | Pei et al. |
| 2011/0252289 A1 | 10/2011 | Patapoutian et al. |
| 2013/0282961 A1 | 10/2013 | Minamimoto |
| 2014/0237298 A1* | 8/2014 | Pe'er .................. G11C 16/3418 714/42 |
| 2016/0292025 A1 | 10/2016 | Gupta et al. |
| 2017/0277471 A1 | 9/2017 | Huang et al. |
| 2017/0294237 A1* | 10/2017 | Li ....................... G11C 11/5628 |
| 2018/0113773 A1 | 4/2018 | Krishnan et al. |
| 2018/0294029 A1 | 10/2018 | Rao |
| 2018/0357535 A1 | 12/2018 | Shulkin et al. |
| 2019/0043604 A1 | 2/2019 | Baca et al. |
| 2019/0108888 A1 | 4/2019 | Sarkar et al. |
| 2019/0189227 A1* | 6/2019 | Yang .................... G11C 16/349 |
| 2019/0189236 A1 | 6/2019 | Poliakov et al. |
| 2019/0267105 A1 | 8/2019 | Muchherla et al. |
| 2019/0324876 A1 | 10/2019 | Singidi et al. |
| 2019/0332298 A1 | 10/2019 | Madabhushi |
| 2020/0027503 A1 | 1/2020 | Chen et al. |
| 2020/0066364 A1 | 2/2020 | Liikanen |
| 2021/0398604 A1* | 12/2021 | Li ...................... G11C 16/3445 |

FOREIGN PATENT DOCUMENTS

| | | |
|---|---|---|
| WO | 2016014303 A1 | 1/2016 |
| WO | 2019119342 A1 | 6/2019 |

OTHER PUBLICATIONS

Advisory Action for U.S. Appl. No. 16/701,133, dated Dec. 16, 2021.

Final Office Action for U.S. Appl. No. 16/701,133, dated Sep. 16, 2021.

Office Action for U.S. Appl. No. 16/701,133, dated Mar. 23, 2022.

Notice of Allowance for U.S. Appl. No. 16/701,133, dated Sep. 28, 2022.

Notice of Allowance for U.S. Appl. No. 17/093,626, dated Jun. 28, 2022.

* cited by examiner

MULTI-NON-VOLATILE MEMORY SOLID STATE DRIVE BLOCK-LEVEL FAILURE PREDICTION WITH SEPARATE LOG PER NON-VOLATILE MEMORY

RELATED APPLICATION DATA

This application claims the benefit of U.S. Provisional Patent Application Ser. No. 63/073,923, filed Sep. 2, 2020, U.S. Provisional Patent Application Ser. No. 63/073,926, filed Sep. 2, 2020, and U.S. Provisional Patent Application Ser. No. 63/076,370, filed Sep. 9, 2020, all of which are incorporated by reference herein for all purposes.

This application is related to U.S. patent application Ser. No. 16/701,133, filed Dec. 2, 2019, which claims the benefit of U.S. Provisional Patent Application Ser. No. 62/926,420, filed Oct. 25, 2019, both of which are incorporated by reference herein for all purposes.

This application is related to U.S. patent application Ser. No. 17/093,626, filed Nov. 9, 2020, which claims the benefit of U.S. Provisional Patent Application Ser. No. 63/073,923, filed Sep. 2, 2020, U.S. Provisional Patent Application Ser. No. 63/073,926, filed Sep. 2, 2020, and U.S. Provisional Patent Application Ser. No. 63/076,370, filed Sep. 9, 2020, all of which are incorporated by reference herein for all purposes.

FIELD

The inventive concepts relate generally to storage devices, and more particularly to improved predicted failure of blocks in a Solid State Drive (SSD).

BACKGROUND

Solid State Drive (SSD) failures in the field may lead to a server shutdown and hence impair the performance and availability of the datacenter-scale applications. To prevent such unexpected failures, systems that employ SSDs usually use simple threshold-based models to avoid such failures by replacing the drives prior to their failure. Such protection mechanisms may either lead to high degrees of false alerts, or are not able to predict/avoid all the SSD failures. Further, in case of a physical error, the SSD is not able to recover from the error and hence avoid device failure.

A need remains to provide a fine-grained block failure prediction.

DETAILED DESCRIPTION

Figure 1:
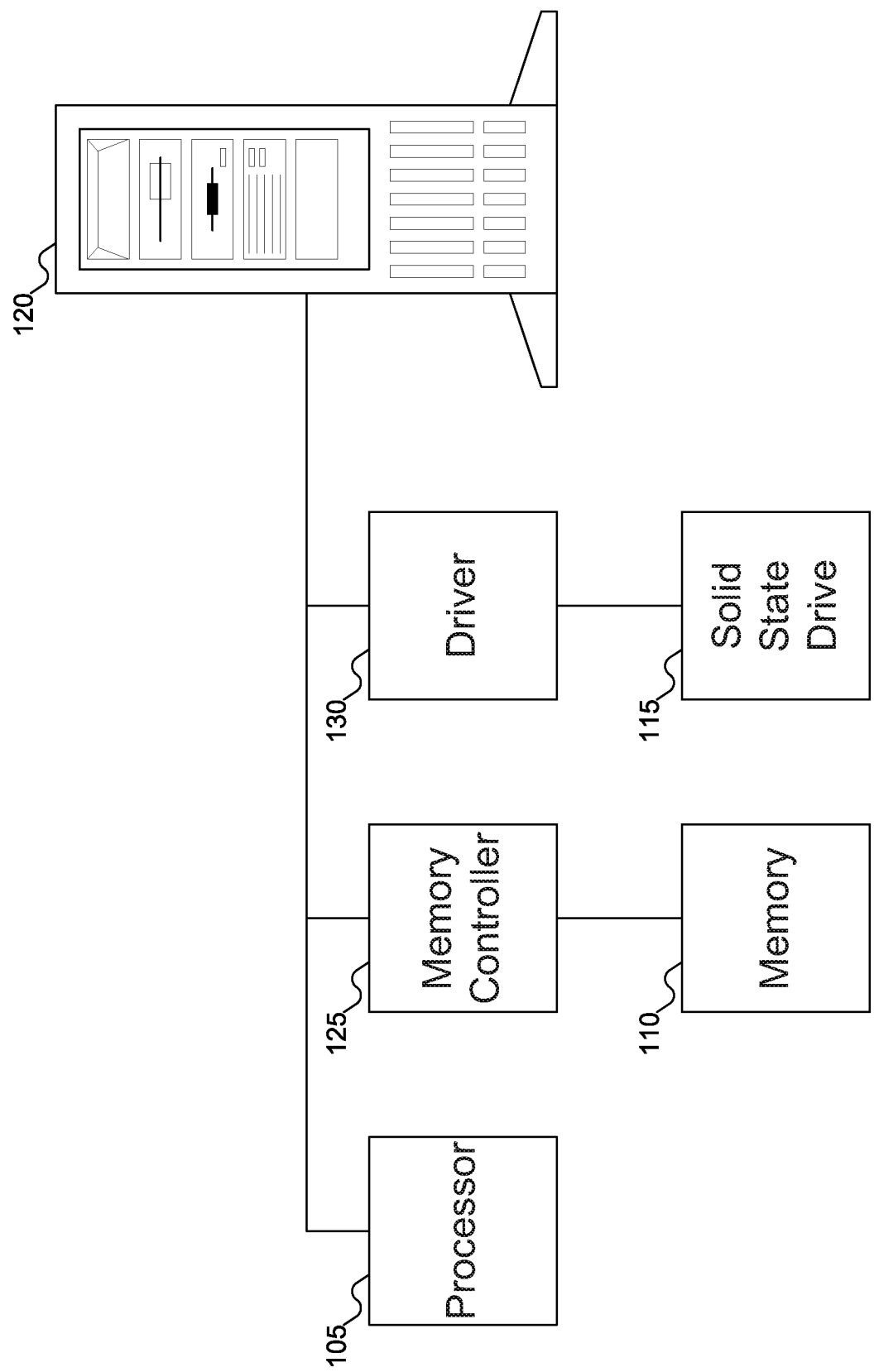
FIG. 1 shows a system including a Solid State Drive (SSD) that may perform fine-grained block failure prediction, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In various embodiments of the inventive concept, the disclosed systems are generally directed to a firmware-based Solid State Drive (SSD) failure protection mechanism for early detection and isolation of errors. This failure mechanism may avoid the failure of the drive, or at least prevent replacing the drive prematurely.

An SSD may include several flash chips, each containing a number of blocks. A block may include any number of pages. A page is typically several kilobytes in size, and is typically the smallest unit for reading and writing data to the SSD. An SSD controller (which may be implemented in firmware) may include the logic used to service read and write requests, run wear-levelling algorithms, run error recovery procedures, combinations thereof, and/or the like.

In some respects, an SSD page may include Error Correction Code (ECC) metadata that the SSD controller may use to recover and fix a limited number of bit errors (typically, 1-2 bit errors). If the number of bit errors due to hardware failure exceeds a certain number, the SSD controller may not be able to correct the error, and therefore the SSD controller may provide the corrupted data to the host. If such failures occur multiple times, the device may be selected for replacement, which may incur a relatively high cost to the device manufacturer, and may further impair the performance and availability of the applications due to a consequent server shutdown.

On the other hand, when writing data to a flash page (e.g., during program operation), if an error occurs, the page may be marked as "failed" and is not used anymore. Once a certain number of pages in a block are failed, the entire block may be retired. SSDs usually reserve some spare blocks to replace such withdrawn blocks. If the SSD runs short on the number available spare blocks (e.g., more than about 90% of spare blocks used), the device may need to be replaced.

There may be situations where a great majority of blocks in the drive are functioning normally (normal blocks), with a small fraction of them being faulty (bad blocks). If the read operations are targeted at a bad block and frequently fail (reading corrupted data or failing to read due to hardware faults), the entire drive may be targeted for replacement in order to prevent future failure and avoid data loss. But if the fine-grained block errors/faults could be predicted early in time and subsequently avoided/recovered, the bad blocks could be retired/withdrawn, which would prevent the SSD from storing data on those blocks and thereby avoid further failures and data corruption/loss.

Predicting fine-grained (block-level) errors/faults in the SSDs (with thousands of blocks) may involve (i) storing a relatively large amount of history (e.g., time series) data corresponding to the blocks of the SSD and (ii) processing/analyzing of relatively large datasets to predict and avoid the failure. With respect to the amount of history data needed, whether such metadata information is stored in the Dynamic Random Access Memory (DRAM) space on SSD or in flash memory itself, the amount of data to be stored grows with the growing failure history information. Storing this information may incur a relatively high cost of storage and might even sacrifice a majority of drive's capacity. With storage devices embodying a limited amount of DRAM and being sensitive to their price per gigabyte, the data storage requirements are not trivial, nor is it straightforward or reasonably efficient to sacrifice a large part of the device's storage capacity to store such failure time-series data.

With respect to the processing required to make the predictions, SSDs typically have limited processing power, which is mainly used for their internal operations such as flash translation layer, and wear levelling and scheduling. Processing large amount of data inside the SSD to predict the block-level failures/errors may be difficult.

To address the above challenges regarding the block-level failure prediction, embodiments of the inventive concept leverage the temporal and spatial locality of physical errors in each block and/or pages within each block. Temporal locality refers to frequent occurrences of errors in the same physical page and/or block; spatial locality refers to the occurrences of errors in neighboring physical parts (e.g., page or block). By leveraging the locality in errors' occurrences, only a relatively limited amount of data associated with only the past several errors may be needed (instead of the error history of the device), which may be used to predict a block failure. As a general rule, it may be expected that a page/block that has generated faulty data is more likely to generate errors in the future. Also, when a page in a block fails, it may be likely for its adjacent pages in the same block to produce errors as the failed page and the adjacent pages may all in the same physical component.

Predicting Block-Level Failures

As mentioned above, predicting block-level failures may include satisfying relatively complex capacity and processing requirements. One approach may use a fine-grained history log data corresponding to thousands of blocks in order to make an accurate prediction, but this dataset size grows over time and may dwarf the storage of user data. Instead, embodiments of the inventive concept use a two-step identification and verification mechanism to locate a suspected block and then use a learning-based model to verify the future failure of the block.

First, leveraging the locality in the physical errors to identify the suspected drives, recent error information may need be stored. For example, only the last k entries of error history—that is, the k most recent incidents—may be retained instead of the entire history of the errors throughout the operation of the drive. Errors that are older than the last k entries may be discarded. Such information, despite storing information regarding the most recent errors, may help identify a suspected block due to the locality of errors. For instance, if 10 errors out of past 100 errors are produced by a specific page within an identified block, that fact suggests that future errors in the same page or in its adjacent pages in the same block are possible. Thus, given information about the past k errors, a suspected block may be identified using potentially orders of magnitude less data than the entire error history of the device.

In the second step, although the suspected blocks are likely to produce errors in the near future, classifying such blocks as faulty blocks and retiring them may lead to high inefficiencies. Such a threshold-based identification mechanism may not be able to accurately capture the failure information and may generate false alerts, resulting in retiring healthy blocks and wasting the drives' capacity. In order to prevent such inaccurate and threshold-based predictions, after identifying a suspected block, a prediction model (which has been already trained) may be used to more accurately predict the bock failure.

Obtaining Block-Level Parameters

Running a previously-trained prediction model requires time series information related to the suspected block in order to verify its failure. Keeping track of such fine-grained information might lead to high capacity requirements that may grow well beyond the storage device capacity. Instead, embodiments of the inventive concept to extract and obtain some of block-based log data from the available drive-based log data (either directly or with some modifications) with respect to the definition and interpretation of each parameter. In particular, to build a set of parameters for a suspected block, i.e., set S={$param_1$, $param_2$, ... }, and feed it into the prediction module, the log data may be divided into two categories:

(i) Precise block-based log data: S_Block_Precise={$p_1$, $p_2$, ... }, and (ii) Approximate block-based log data: S_Block_Approx={$a_1$, $a_2$, ... }.

Then, to derive set S, S=S_Block_Precise∪S_Block_Approx, which is equivalent to S=S_Block_Precise+S_Block_Approx, since the two sets are disjoint. For parameters that are directly associated with the error/fault information (such as the numbers of read errors, write errors, and erase errors), precise information for each block may be stored. The amount of block-based data required may be relatively negligible (e.g., for a 1 TB SSD only a few megabytes may be needed), and is manageable by SSDs that already include several gigabytes of DRAM space. Moreover, such data does not refer to time-series information and is only one counter for each parameter per block.

To extract time-series log data, such information may be derived from the global drive-level error information maintained for the past k errors. Since the suspected block is chosen based on the past k error incidents, its recent error information already exists in the global drive-level error data. The data for the recent k errors associated with a drive may contain the accumulated error information for a block, which may be derived by summing up the error counters for a block with the new error data. Note that the counters employed for each block only contains the cumulative error information. The global error information contains complete data on the most recent k errors, which may include the ones produced by the suspected block.

The approximate parameters for a block (i.e., S_Block_Approx) may be extracted from drive-level error information. Some of the log information for the suspected block may be approximately derived from the drive-level parameters as they refer to the state of the drive/block, not the error information. In other words, these parameters may be averaged across all the blocks and therefore may be representative of a single block. For instance, some parameters, such as "Number of Reads" and "Number of Writes", which are based on the total number of reads and writes to the drive and is an indication of drive's age, may be averaged across all blocks to approximate the corresponding parameters for the suspected block.

By combining the history-based drive information with counter-based block-level log data, the set of parameters for a suspected block may be generated and fed it into the prediction module. Then, in case of a failure alert for the suspected block, the block may be retired early to avoid further errors associated with that block and consequent drive replacement. Thus, instead of maintaining time-series data for each block that may increasingly grow, only light-weight counters for each block need be maintained. Further, for the time-series drive information only the most recent k error incidents may be maintained, which accounts for only few kilobytes of data. With such optimizations, the dataset size and computation/processing requirements needed to perform fine-grained block-level failure prediction are addressed. The amount of data required for the proposed enhancements is less than naïve block-level time-series log data, and subsequent processing of such small amount of data may be relatively fast, and may permit, for example, execution in the real-time.

Required Metadata and Data Structures

As previously discussed, light-weight error information/counters for each block need be maintained in DRAM or other storage for the SSD. Assuming that an SSD includes n blocks, only n entries are needed. On the other hand, for the drive-level information, embodiments of the inventive concept may maintain the past k error incidents' information. For each of the k error incidents, information about the physical location of error (page, block), the time at which the error has occurred (timestamp), the error counters of the block at that time, and log data on the SSD may be stored.

As mentioned previously, the overhead required for embodiments of the inventive concept are relatively low. Assume an SSD with 1 TB of storage capacity, with 256 pages per block and a page size of 4 KB:

Number of pages=1 TB/4 KB=256,000,000

Number of blocks=256,000,000/256=1,000,000

If there are three error attributes for each block (a counter for each of the number of read errors, write errors, and erase errors, each of which may be a 4-byte integer), the total memory space required for the block-level error data may be 1,000,000*3*4 B=12 MB.

For the drive-level information, assume that k=100 (that is, information regarding the most recent 100 error incidents is stored), with each error incident requiring 1 KB of storage. Therefore, the total capacity required for the drive-level metadata is 100 KB. Thus, the total memory overhead will be 12.1 MB, which is negligible for the SSDs containing few gigabytes of DRAM space.

Note that, the error log data for SSDs is typically specific to the firmware and device model. For sake of illustration, some parameters of the log data that might be stored include Critical Warning, Available Space, Data Units Read, Data Units Written, Power Cycles, Power On Hours, Unsafe Shutdowns, Media Errors, Warning Temperature Time, and Critical Composite Temperature Time. Embodiments of the inventive concept may also store other parameters.

Execution Flow

In case of an error occurrence incident in block I, the error counters for the block-level metadata may be read and updated. The drive-level metadata may then be updated to reflect the new error incident information. The information stored in the drive-level metadata may include the parameters discussed above, such as the location of the error (page ID/block ID), timestamp, etc.

Error Occurrence

Once an error occurred, the precise parameters from that target block may be obtained, and combined with the approximate parameters extracted depending on the Not-AND (NAND) flash type of the block. This information may then be stored as an entry in the fault-history table.

Identifying a Suspected Block

In order to identify the suspected block, the drive-level metadata table may be periodically scanned to check to see if a block has produced repeated errors (by checking block ID field in this table). This scan may be performed at regular intervals (for example, every minute), or after some number of errors have been logged (for example, after every error, every fifth error, etc.). If several of the past errors occurred in the same block, that block may be added to the suspected block pool: the SSD may then temporarily avoid using it to store data (but it may still be read, since it may contain valid data). More specifically, if the number of incidents corresponding to a specific block among the most recent k errors account for more than a threshold, then that block is marked as "suspected".

There are two different ways to set a threshold:

(1) Define a static threshold $\alpha$. When the number of error incidents corresponding to a specific block exceeds $\alpha\%$ of the most recent k errors, then mark that block as suspected. The threshold parameter $\alpha$ may be tuned based on the protection/reliability level requirements. For example, setting $\alpha=10$, indicates that, if more than 10% of the most recent k error incidents involved a particular block ID, that block is marked as suspect. Alternatively, $\alpha$ may be a fixed number rather than a percentage: that is, setting $\alpha=10$ indicates that if 10 or more of the most recent k error incidents involved a particular block ID, that block is marked as suspect.

(2) Defining an average-based thresholds. Such a threshold may be obtained by averaging the total number of errors (in the device log) across all the blocks in the drive. Suspected block identification decisions may be made (directly or implicitly) based on this threshold: if a particular block experiences more than its share of errors among the most recent k error incidents, the block may be marked as suspect. To give an example, assume that a device with 256,000 total blocks has experienced a total of 100 errors. The ratio of the number of errors to the number of blocks is $100/256,000=1/2,560$. If a block experiences more than this number of errors, then the block may be marked as suspect.

Note that until the number of errors is roughly in proportion to the number of blocks, even a single error may lead to a block being marked as suspect. To prevent every error from triggering a block being marked as suspect, the average-based threshold may be scaled up (or down) by any desired factor. Thus, for example, the average-based threshold may be multiplied by a number (for example, 10,000) to produce a threshold that is effectively greater than one. This scaling value may also vary over time or in response to the number of errors, to prevent the average-based threshold from becoming too large.

Prediction

Once a suspected block is identified, the set of parameters corresponding to the suspected block may be generated (set S) and fed into the failure prediction module. As discussed above, part of S may be based on the block-level error information, and part of S may be derived from drive-level log information that may be extracted from the drive-level metadata stored for the past k errors (which may reflect an average across all the blocks to have an estimation of block-level data). Any algorithm may then be used to process this data and decide whether the block is actually predicted to fail. Example algorithms that may be used include a Logistic Regression or a Random Forest algorithm. If the predicted outcome indicates the block is likely to fail in the future, the block may be retired by first copying its valid data into other blocks and then removing the suspect block from the available blocks list. To minimize the processing power required for the prediction module, the prediction module might not execute for all the blocks, or execute constantly. Instead, the prediction module may be triggered for a suspected block and when that block is identified as a suspected block.

As stated above, any desired prediction module may be selected that uses some time-series data in order to predict an event. An example of the prediction module may be a machine learning-based failure prediction model (examples of which include Random Forest, Logistic Regression, Outlier Detection, Anomaly Detection, etc.) which has been primarily trained and its information for prediction (e.g., optimized weights) already embedded in the drive firmware. Thus, upon receiving the past errors' information, the model may predict the probability of failure for a specific block by running a light-weight computation.

QLC Drive Block-Level Failure Prediction

The above description assumes that an SSD employs only one NAND technology. In a QLC drive, however, SLC NAND flash may be also used for endurance and performance purposes. Thus, the above approach for extracting the block-level parameters may not be applicable due to the following reasons: (1) Different NAND flash technologies may have different endurance and error characteristics. For instance, the QLC error rate may be higher than SLC. (2) Different NAND flash technologies may have different error correction mechanisms. (3) Different NAND flash technologies within the SSD may be used for different purposes. For instance, SLC NAND may be used as a caching layer for QLC drive to reduce the amount of write to QLC and also improve the performance. Thus, the workloads submitted no these two technologies may be different, and the accesses (e.g., number of reads and writes) to the different forms of NAND flash may not be uniform. (4) Access patterns to different NAND flash technologies within the SSD may be different (random vs sequential) and result in different wear-out. Thus, they have different aging patterns and use.

The above reasons may perturb the approach described for block-level failure prediction in an SSD using only a single type of NAND flash: (i) Error history: due to reasons (1) and (2), if only one history list is kept for recent errors, it is likely that one NAND flash type (e.g., QLC) may accrue more errors over the time, hence always hitting the threshold and cause a starvation for the other NAND flash type (e.g., SLC). (In this context, "starvation" is intended to mean that one NAND flash type, such as SLC, may be denied resources, processing, or other benefits because another flash media type, such as QLC, is taking all the resources, processing, or other benefits.) In other words, given a constant list length and threshold, it is likely that one NAND flash type may dominate the fault incidents and result in neglecting the other NAND flash type. Hence, a mechanism that avoids letting one NAND flash type dominate the errors may be used to isolate the impact of errors of different NAND flash types on identifying faulty blocks. (ii) Precise block parameters: different NAND flash types have different error parameters, and appropriate precise block parameters according to NAND flash type may be worth maintaining. (iii) Approximate parameters (driven from drive-level parameters): due to reasons (3) and (4), SLC flash and QLC flash may have different number of reads/writes as well as different aging factors. Thus, when deriving approximate block-level parameters, averaging out those parameters across the total number of blocks in the drive may not provide an accurate analysis. Further, any review of approximate block-level parameters may be proportional to aging and workload. (iv) Machine learning prediction model: the model may take into account the NAND flash type. Thus, either different models may be trained per NAND flash type, or the NAND flash type may be provided to the model, when training and predicting.

Separate Drive-Level Parameters

One approach to the situation where an SSD includes multiple types of NAND flash may be to maintain separate drive-level parameters (e.g., log data which may be generated by the SSD or other storage device performing some function or functions using a built-in processor, which may be implemented as a Field Programmable Gate Array (FPGA), Application-Specific Integrated Circuit (ASIC), central processing unit (CPU), etc.) for each NAND flash type. For instance, in an SSD having both QLC and SLC NAND flash, two set of SMART logs may be maintained, one each for QLC and SLC components.

To support faulty block identification and verification, precise parameters may be stored. These precise parameters may include critical parameters related to errors/faults. Thus, based on the NAND flash type, suitable error parameters may be maintained.

Approximate parameters may be divided into two categories: (i) drive-level, and (ii) NAND-level.

Drive-level parameters may include parameters related to the drive, and might not vary based on NAND flash type. For instance, some parameters such as "capacitor health", "DRAM errors", and "drive temperature" are not related to the specific NAND flash type, but rather related to the drive itself. These parameters may be used directly.

NAND-based parameters may include sets of NAND-level log data (such as SMART log) maintained in the SSD for each NAND flash type. Thus, for example, an SSD including both QLC and SLC NAND flash may include a QLC log to track log information in the QLC NAND flash (such as number of reads, writes, etc.), and an SLC log, to track log information in the SLC NAND flash (again, such as number of reads, writes, etc.).

To extract block-level approximate parameters, these parameters may be averaged across all the blocks and may be representative for a single block. For instance, some parameters, such as "Number of Reads" and "Number of Writes", which is based on total number of reads and writes to the drive, and is an indication of drive's age, may be averaged across all blocks to approximate the corresponding parameters for the suspected block.

Unified Drive-Level Parameters

A second approach to the situation where an SSD includes multiple types of NAND may be to maintain unified drive-level parameters (e.g., SMART log) for all NAND flash types in the drive. For instance, the number of reads in the SMART log for this model may refer to the total number of reads to both SLC and QLC.

To support faulty block identification and verification, precise parameters may be stored. These precise parameters may include critical parameters related to errors/faults. Thus, based on the NAND flash type, suitable error parameters may be maintained.

Approximate parameters may be divided into two categories: (i) drive-level, and (ii) NAND-level.

Drive-level parameters may include parameters related to the drive, and may not vary based on NAND type. For instance, some parameters such as "capacitor health", "DRAM errors", and "drive temperature" are not related to the specific NAND flash type, but rather related to the drive itself. These parameters will be used directly.

NAND-based parameters may include parameters related to specific NAND flash type and mostly related to their usage and aging. For instance, the number of reads/writes and erases may vary for QLC and SLC NAND flash. To extract these parameters, the proportional amounts may be derived by considering each NAND flash type capacity and number of blocks and the number of reads and writes to each NAND flash type.

Thus, these parameters may be directed according to the number of reads and writes to each NAND type. For example, assume QLC_RD/WR and SLC_RD/WR refer to the number of reads and writes to QLC and SLC components, respectively. Each parameter may be commensurate to these parameters. For a given value DRIVE_X representing a drive-level parameter "X" and for values of $\alpha$ and $\beta$ (which may depend on the parameter), the relative values for QLC and SLC may be calculated using the equations below:

$$QLC\_X = \frac{DRIVE\_X * \left( \alpha \left( \frac{QLC_{WR}}{DRIVE_{WR}} \right) + \beta \left( \frac{QLC_{RD}}{DRIVE_{RD}} \right) \right)}{QLC\_BLOCK\_COUNT}$$

$$SLC\_X = \frac{DRIVE\_X * \left( \alpha \left( \frac{SLC_{WR}}{DRIVE_{WR}} \right) + \beta \left( \frac{SLC_{RD}}{DRIVE_{RD}} \right) \right)}{SLC\_BLOCK\_COUNT}$$

The intuition behind the above equations is that the number of reads and writes to these components is a representation of drive's age and usage. Thus, the parameters for each QLC/SLC block may be calculated proportionally and approximately. Constants $\alpha$ and $\beta$, may refer to the relation of that parameter with read and/or write operations. For instance, to calculate the number of erases for a block, $\alpha$ may be set to 1 and $\beta$ may be set to 0, since erase operations are directly related to write operations. On the other hand, to calculate the parameter "controller busy time" $\alpha$ may be set to 0.5, and $\beta$ may be set to 0.5, since this parameter is related to both read and write operations. As a general rule, $\alpha$ and $\beta$ may be set to values that range from 0 to 1 (inclusive), and $\alpha+\beta=1$.

Note that the number of reads and writes may be directly obtained from QLC/SLC_RD/WR counters, which may be tracked by the SSD.

Starvation Issue

Since QLC NAND flash may be more likely to accrue errors, there may be a situation where SLC NAND flash blocks might not be chosen if the same threshold is used for identifying QLC and SLC suspected blocks (whether static or dynamic threshold is used). In order to avoid this situation, the table space may be split into two parts according to the capacity of SLC and QLC NAND flash components. For instance, if the total number of entries is "k", and QLC capacity is 20 times the SLC capacity, $k*20/21$ entries may be allocated to QLC, and k/21 entries may be allocated to SLC. Then, the threshold based mechanisms discussed above, but applied to each portion of the table separately, may be used to identify suspected blocks for SLC and QLC NAND flash.

Prediction

Once a suspected block is identified, the set of entries associated from that block may be extracted and fed into the failure prediction module.

If the prediction outcome indicates the future failure, the block may be retired, by first copying its valid contents to other blocks and then removing it from the available blocks list. The prediction module may process its input to determine whether or not the suspected block is expected to fail soon. Moreover, to address the processing power required for the prediction module, the prediction module may be executed only for a suspected block, which may avoid the prediction module execute for all the blocks constantly over time.

Note that, since QLC and SLC error characteristics are different, one model may be trained to cover both types of NAND flash, but the model may be provided the NAND flash type as well (SLC or QLC) as a parameter. Then, the prediction module may make an appropriate prediction model based on the NAND flash type. Alternatively, two different models may trained, one for SLC and one for QLC.

Note that, a generic prediction module may be used which may use some time-series data in order to predict an event. An example of the prediction module may be a machine learning-based failure prediction model (examples are Random Forest, Logistic Regression, Outliner Detection, etc.), which has been primarily trained and its information for prediction (e.g., optimized weights) may already be embedded in the drive firmware. Hence, upon receiving the past errors information, the model may be able to predict the probability of failure for a specific block by running a light-weight computation.

Alternatively, different models may be trained for different NAND flash types, with the appropriate model selected based on the NAND flash type of the block that is currently suspect.

Finally, although the above analysis focuses on an SSD with two NAND flash types—specifically, QLC and SLC—embodiments of the inventive concept may extend to SSDs using any number of NAND flash types, without reference to any specific NAND flash type, and to other non-volatile storage technologies (for example, NOR flash).

FIG. 1 shows a system including a Solid State Drive (SSD) that may perform fine-grained block failure prediction, according to an embodiment of the inventive concept. In FIG. 1, the machine may include processor 105, memory 110, and Solid State Drive 115. Processor 105 may be any variety of processor. (Processor 105, along with the other components discussed below, are shown outside the machine for ease of illustration: embodiments of the inventive concept may include these components within the machine.) While FIG. 1 shows a single processor 105, machine 120 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 105 may be coupled to memory 110. Memory 110 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 110 may also be any desired combination of different memory types, and may be managed by memory controller 125. Memory 110 may be used to store data that may be termed "short-term": that is, data not expected to be stored for extended periods of time. Examples of short-term data may include temporary files, data being used locally by applications (which may have been copied from other storage locations), and the like.

Processor 105 and memory 110 may also support an operating system under which various applications may be running. These applications may issue requests to read data from or write data to either memory 110 or SSD 115. SSD 115 may be used, for example, to store initial parameters (or ranges of values for initial parameters, along with what types of behaviors the ranges of values represent) used to initialize the simulation. SSD 115 may be accessed using device driver 130. While FIG. 1 shows SSD 115, embodiments of the inventive concept may include other storage device formats that may benefit from fine-grained block failure prediction: any reference to "SSD" below should be understood to include such other embodiments of the inventive concept.

Figure 2:
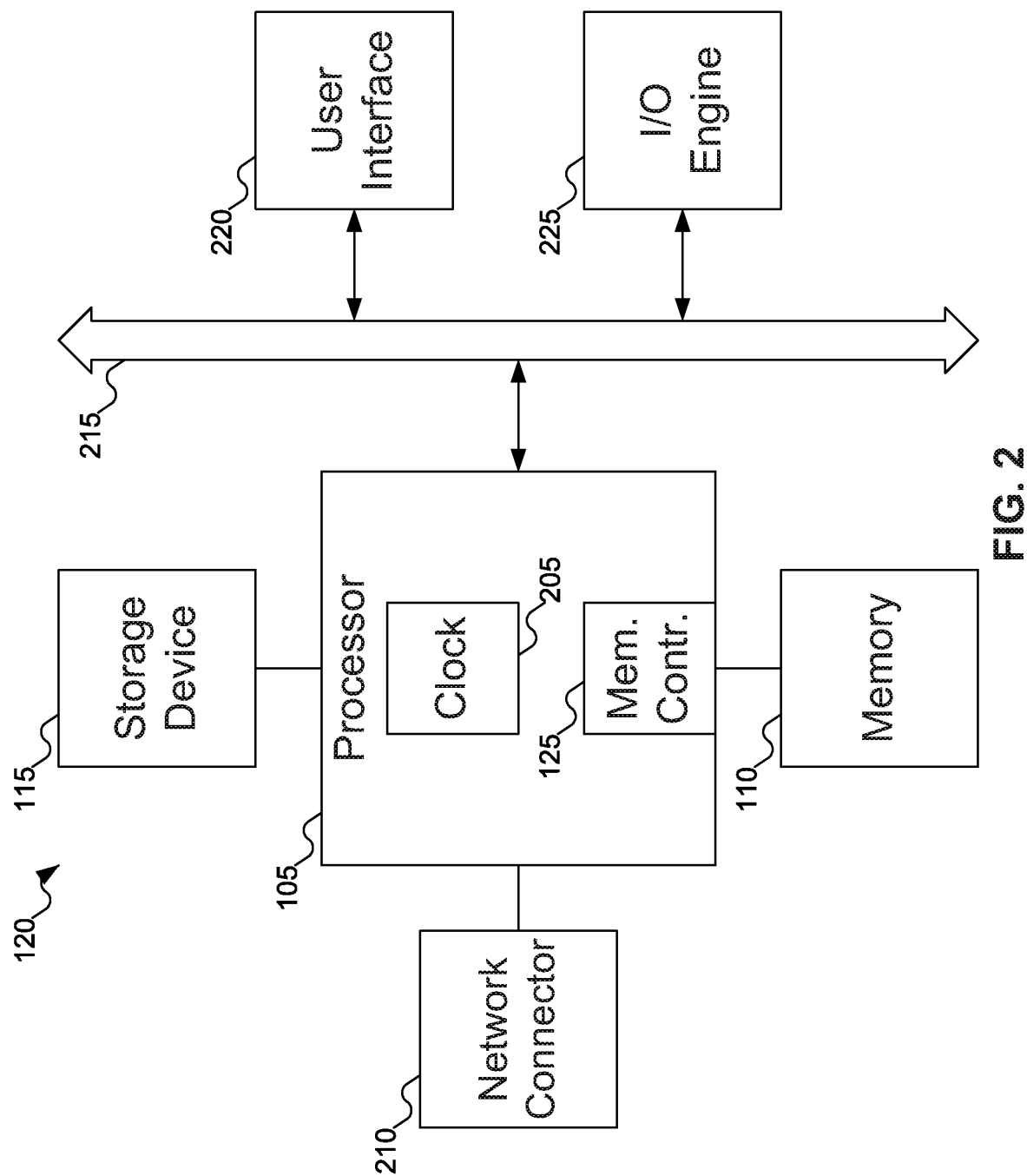
FIG. 2 shows details of the machine of FIG. 1, according to an embodiment of the inventive concept.

FIG. 2 shows details of the machine of FIG. 1. In FIG. 2, typically, machine 120 includes one or more processors 105, which may include memory controllers 125 and clocks 205, which may be used to coordinate the operations of the components of the machine. Processors 105 may also be coupled to memories 110, which may include random access memory (RAM), read-only memory (ROM), or other state preserving media, as examples. Processors 105 may also be coupled to storage devices 115, and to network connector 210, which may be, for example, an Ethernet connector or a wireless connector. Processors 105 may also be connected to buses 215, to which may be attached user interfaces 220 and Input/Output interface ports that may be managed using Input/Output engines 225, among other components.

Figure 3:
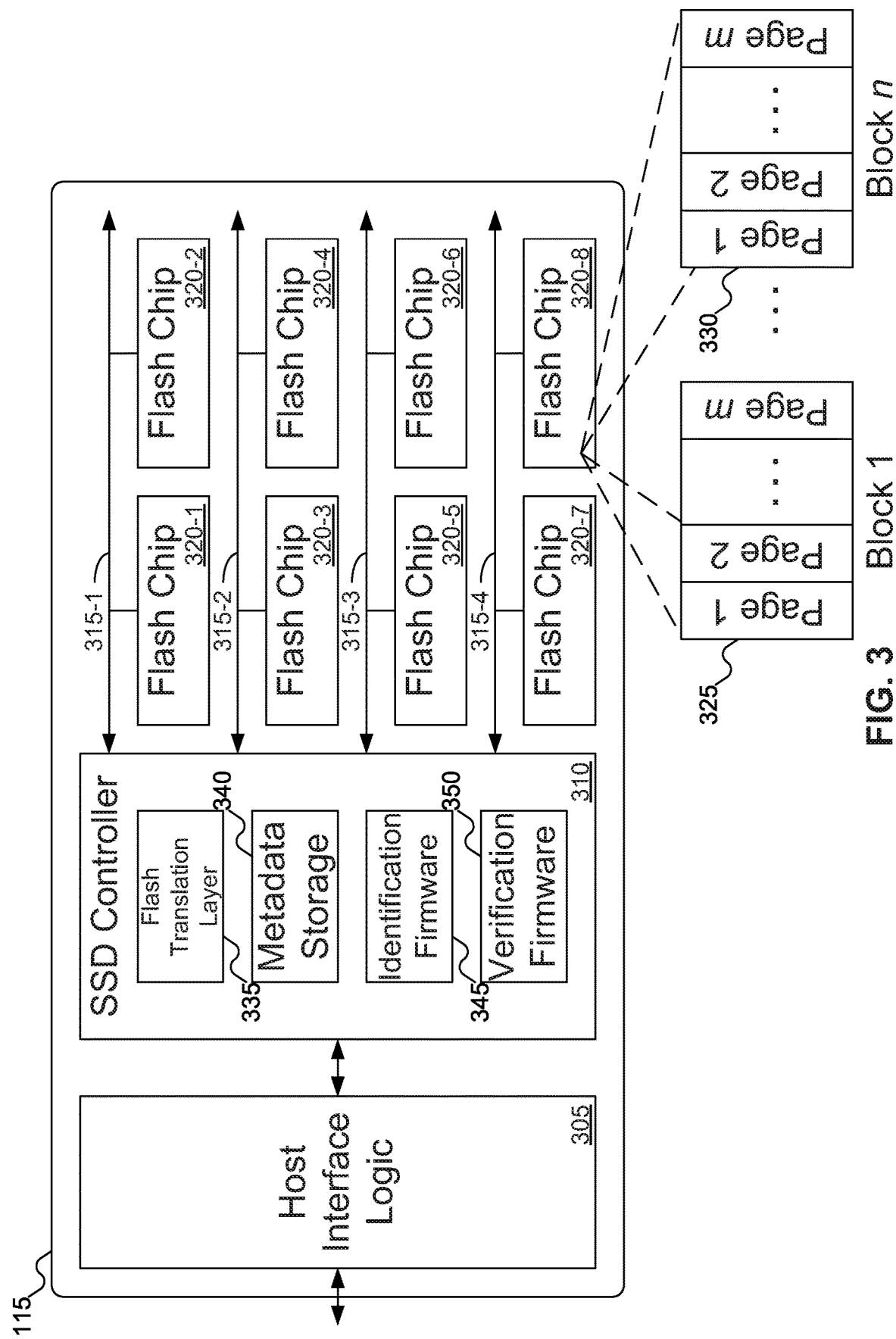
FIG. 3 shows details of the SSD of FIG. 1, according to an embodiment of the inventive concept.

FIG. 3 shows details of the SSD of FIG. 1. In FIG. 3, SSD 115 may include host interface logic 305, which may provide an interface between SSD 115 and a host computer (such as machine 120 of FIG. 1). SSD 115 may also include SSD controller 310, various channels 315-1, 315-2, 315-3, and 315-4, along which various flash memory chips 320-1, 320-2, 320-3, 320-4, 320-5, 320-6, 320-7, and 320-8 may be arrayed. Although FIG. 3 shows four channels and eight flash memory chips, a person skilled in the art will recognize that there may be any number of channels including any number of flash memory chips.

Within each flash memory chip, the space may be organized into blocks, which may be further subdivided into pages. For example, flash memory chip 320-7 is shown as including blocks 1 through n (identified as blocks 325 and 330), each of which may contain pages numbered from 1 to m. While there may be multiple pages assigned the same number (for example, page 1) in multiple blocks, the combination of a page identifier (ID) and a block ID may uniquely identify a particular page within flash memory chip 320-7. (Alternatively, the combination of page ID, block ID, and flash memory chip ID may uniquely identify a page within SSD 115.)

The reason for the distinction between blocks and pages stems from how SSDs handle read, write, and erase operations. The page is typically the smallest unit of data that may be read or written on an SSD. Page sizes may vary as desired: for example, a page may be 4 KB of data. If less than a full page is to be written, the excess space is "unused".

But while pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the inventive concept, the unit of erasure may differ from the block: for example, it may be a superblock, which may be a set of multiple blocks.)

SSD controller 310 may include flash translation layer 335, metadata storage 340, identification firmware 345, and verification firmware 350. Flash translation layer 335 may handle translation of logical block addresses (as used by processor 105 of FIG. 1) and physical block addresses where data is stored in flash chips 320-1 through 320-8. Metadata storage 340 may store metadata information used by SSD 115 in performing the fine-grained block failure prediction. Identification firmware 345 may be used to identify a block that is suspected to be likely to fail, using metadata information stored in metadata storage 340: verification firmware 350 may then determine whether the suspect block is actually likely to fail, again using metadata information stored in metadata storage 340. Identification firmware 345 and verification firmware 350 may be stored in a read-only memory (ROM) or some variant thereof (including, for example, Programmable ROM (PROM), Erasable PROM (EPROM), Electrically Erasable PROM (EEPROM), flash memory, etc.) executed using a processor (not shown in FIG. 3) that may be part of SSD 115: for example, using processing capability native to SSD controller 310. Identification firmware 345 and verification firmware 350 may also be executed using a circuit or circuits designed to implement the described functionality: such circuit or circuits may be implemented using a Field Programmable Gate Array (FPGA), an Application-Specific Integrated Circuit (ASIC), a central processing unit (CPU), or similar structures.

Figure 4:
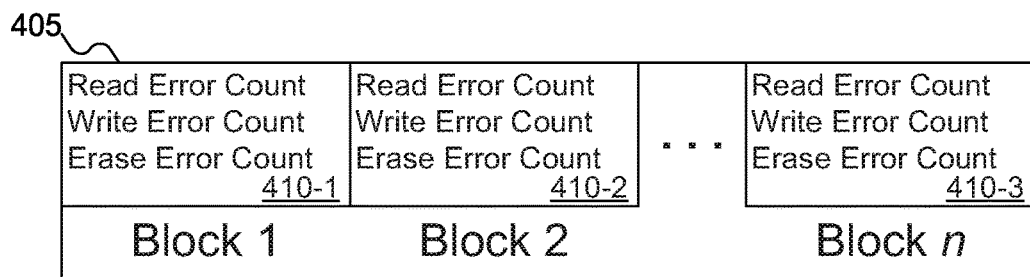
FIG. 4 shows example block-based data that may be used by the SSD of FIG. 1, according to an embodiment of the inventive concept.

FIG. 4 shows example block-based data that may be used by SSD 115 of FIG. 1. In FIG. 4, block-based data 405 may include data for each block, which may be stored in metadata storage 340 of FIG. 3. For example, FIG. 4 shows data for blocks 1 through n, although data for any number of blocks may be included (up to data for each block in SSD 115 of FIG. 1). The data for each block may include counters 410-1, 410-2, and 410-3, which may store the number of read errors, the number of write errors, and the number of erase errors that have occurred for the corresponding blocks. Note that counters 410-1, 410-2, and 410-3 may be cumulative since SSD 115 of FIG. 1 was manufactured: block-based data 405 may also be called precise block-based data: block-based data 405 may be precise as compared with other data, discussed below with reference to FIG. 5.

Each of counters 410-1, 410-2, and 410-3 may require 4 bytes per counter. Since each of counters 410-1, 410-2, and 410-3 includes three counters—one each for the number of read errors, write errors, and erase errors—a total of 12 bytes may be used to store each of counters 410-1, 410-2, and 410-3. Multiply 12 bytes by the number of blocks on SSD 115 of FIG. 1, and the overhead imposed by block-based data 405 may be calculated.

For example, consider an SSD that offers a total of 1 TB of storage, where each block includes 256 pages and each page includes 4 KB of data. 268,435,456 pages are needed to store 1 TB of data in 4 KB pages. With 256 pages per block, that means the SSD would include a total of 1,048, 576 blocks. At 12 bytes for the three counters per block, block-based data 405 would require a total of approximately 12 MB of storage, little more than one-thousandth of a percent of the overall storage offered by the SSD.

Note that counters 410-1, 410-2, and 410-3 indicate the number of errors that have occurred in each block. These errors may be congregated within one or a few of the pages in the block, or the errors may be scattered among the pages in the block. In this manner, block-based data 405 provides for determining some spatial locality among errors, as a page that has one error is more likely to have other errors, as are other pages nearby (as compared with pages that are in other blocks).

Figure 5:
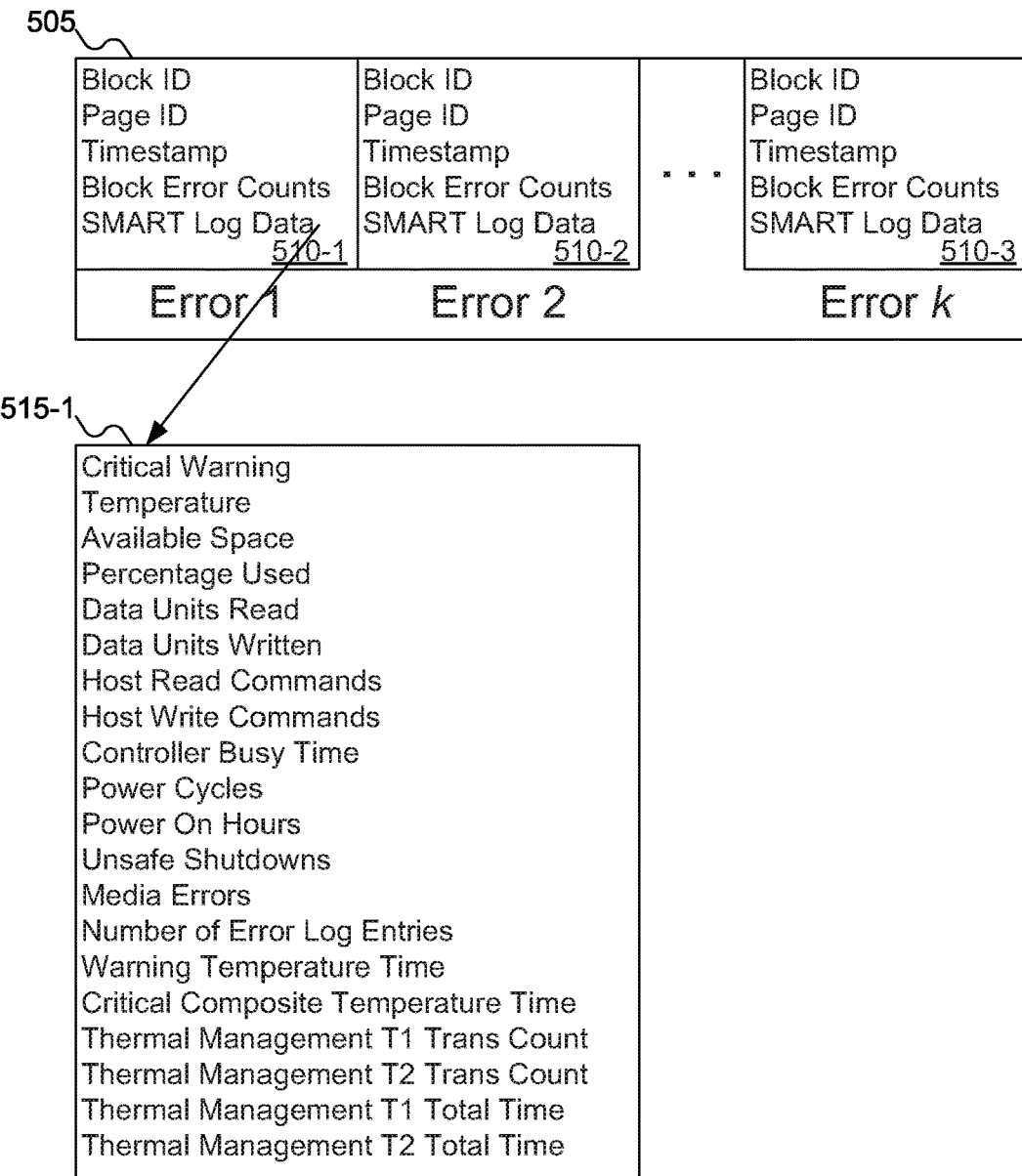
FIG. 5 shows device-based log data that may be used by the SSD of FIG. 1, according to an embodiment of the inventive concept.

FIG. 5 shows device-based log data that may be used by SSD 115 of FIG. 1. In FIG. 5, device-based log data 505 is shown. Device-based log data 505 may include data about specific errors that have occurred on SSD 115 of FIG. 1, and may be stored in metadata storage 340 of FIG. 3. But rather than storing data for all errors that have ever occurred on SSD 115 of FIG. 1, device-based log data 505 may store data regarding the most recent k errors that have occurred on SSD 115 of FIG. 1. Any older errors may be discarded. Thus, errors 1 through k may not be first k errors to occur on SSD 115 of FIG. 1, but rather may be the most recent k errors that have occurred (with older errors having been previously discarded). k may be any desired value: larger values provide for more information that may be used in determining whether a particular block is predicted to fail, but at the cost of needing to store more data (thereby increasing overhead).

Various data may be stored for each error currently being tracked. For example, as shown in errors 510-1, 510-2, and 510-3, IDs for the page and block may be stored, along with the time when the error occurred, the error counters for the block (that is, the values of precise block-based data 405 of FIG. 4 for the block in which the error occurred, at the time of the error), a timestamp of when the error occurred, and other log data, such as that shown in SMART log data 515-1 (shown for error 510-1). The data shown in FIG. 5 for device-based log data 505 represents one embodiment of the inventive concept: other embodiments may include more, less, or other data than that shown in FIG. 5, without limitation.

In contrast to precise block-based data 405 of FIG. 4, device-based log data 505 may be used to derive approximate block-based data. Because device-based log data 505 stores information only about the most recent k errors on SSD 115 of FIG. 1, device-based log data 505 (and therefore the approximate block-based data derived therefrom) provides for determining some temporal locality among errors, permitting the identification of blocks that have been experiencing more recent errors than other blocks. These k most recent errors may be stored in an error history table (which may also be called a fault-history table).

Because data for only the most recent k errors is stored, the overhead required for storing device-based log data 505 may be computed by knowing the size of the data stored for one error and multiplying by the number of errors for which data is stored. For example, if data is stored for the 100 most recent errors, and the storage for each error is 1 KB, then the total storage required to store device-based log data is 100 KB. Again, relative to the size of SSD 115 of FIG. 1, this storage overhead is a small fraction of a percent of the overall size of SSD 115 of FIG. 1 (approximately one-hundred thousandth of a 1 TB SSD).

The value of k may be set in advance. The value of k may then stay constant for the life of SSD 115 of FIG. 1. Alternatively, k may be configurable, and may change over time depending on user preference. For example, more error information may be desirable as SSD 115 of FIG. 1 ages.

Figure 6:
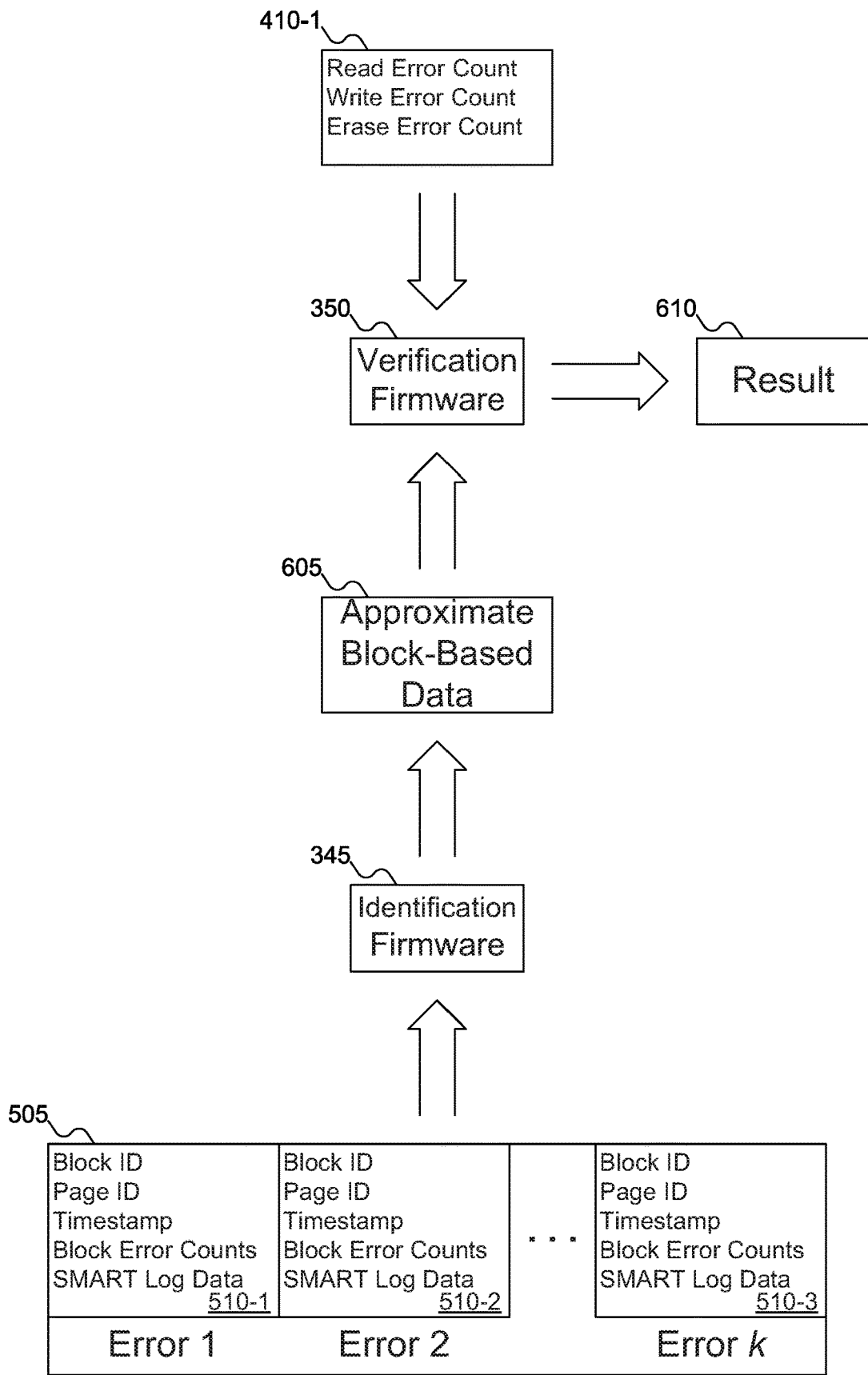
FIG. 6 shows the identification firmware and verification firmware of FIG. 3 operating to determine whether a particular block is expected to fail, according to an embodiment of the inventive concept.

FIG. 6 shows identification firmware 345 and verification firmware 350 of FIG. 3 operating to determine whether a particular block is expected to fail. In FIG. 6, identification firmware 345 may receive device-based log data 505 (which may include SMART log data 515-1 of FIG. 5 for error 510-1, not shown in detail in FIG. 6, as well as other SMART log data for other errors). Identification firmware 345 may then identify the blocks in which each stored error occurred. If the number of errors in a particular block, among the most recent k errors, exceeds some threshold, then the block in question may be suspected of failing soon. Thus, identification firmware 345 may generate approximate block-based data 605 from device-based log data 505.

Any desired threshold may be used to determine whether a particular block is suspected of failing soon. For example, a predetermined, user-specified threshold may be set, where if a larger number of errors than the threshold in the most recent k errors occur in a particular block, that block is suspected of failing soon. This threshold may be number (for example, 10 errors in the most recent k errors), or it may be a percentage (for example, 10% of the errors in the most recent k errors). This threshold may also be tunable based on the number of errors that have actually occurred. For example, if the threshold is set to be a percentage of the total number of errors, then the block that experiences the first error would be automatically suspect, since 100% of the errors would be associated with that block. To avoid this result, identification firmware 345 might not operate until the number of errors that have occurred in SSD 115 of FIG. 1 exceeds some other value: this would prevent identification firmware 345 from identifying blocks as suspected of failing soon too early.

Another threshold that may be used is to calculate the average number of errors per block across the entire SSD. That is, the total number of errors that have occurred (since the SSD was manufactured) may be calculated and divided by the total number of blocks in the SSD. Any block that experiences too many errors relative to this average may then be suspected of failing soon. A percentage of this average may also be used. Again, this average (or its use) may be tunable. For example, until the number of errors experienced by the SSD approaches the number of blocks in the SSD, any block that experiences a single error will have more than the average number of errors, and automatically be considered suspect by identification firmware 345. Thus, identification firmware 345 might not start considering whether blocks are suspected of failing soon until the number of errors exceeds some predetermined value. Alternatively, identification firmware 345 may calculate the relative percentage of errors occurring in a particular block (relative to k) and compare that value with the average number of errors per block across the SSD: if the block experiences a higher percentage of the most recent k errors than average, then identification firmware 345 may suspect the block of failing soon.

In other embodiments of the inventive concept, identification firmware 345 may suspect that a block will fail not because it has experienced a greater share of the errors recently, but based on a total error count. For example, assume that k is chosen to be 100 (that is, device-based log data is stored only the 100 most recent errors. If every $50^{th}$ error occurs in a particular block, that block might not necessarily be considered suspect based on having a higher percentage of errors in the most recent k errors. But over the history of the device, that this block has one out of every 50 errors might mean that this block has experienced far more errors in total than any other block. Thus, identification firmware 345 might examine precise block-based data 405 of FIG. 4 to look for blocks that are suspected to fail soon. A block that has a total error count in excess of some threshold may be identified as suspect, even if the block does not exceed a threshold based on approximate block-based data 605.

In some embodiments of the inventive concept, identification firmware 345 may examine precise block-based data 405 of FIG. 4 without regard to device-based log data 505: in such embodiments of the inventive concept identification firmware 345 might examine the total error count of every block in SSD 115 of FIG. 1. In other embodiments of the inventive concept, identification firmware 345 might examine precise block-based data 405 of FIG. 4 only for the blocks that experienced one (or more) of the most recent k errors: in such embodiments of the inventive concept identification firmware 345 may consider precise block-based data 405 of FIG. 4 in conjunction with device-based log data 505.

Regardless of the particular approach used, identification firmware 345 may operate simply by comparing two values to determine if a particular block is considered suspect. This process make identification of suspect blocks simple.

Identification firmware 345 may operate according to any desired schedule. Identification firmware 345 may operate at regular time intervals: for example, every minute, or every 10 minutes, or every day (smaller and larger intervals are also possible). Alternatively, identification firmware 345 may operate after a certain number of errors has occurred: for example, after every error, or after every fifth error (other number of errors are also possible).

Note that while identification firmware 345 is described as using device-based log data 505 in deciding whether a block is suspect, embodiments of the inventive concept may use precise block-based data 405 of FIG. 4, either instead of or in addition to device-based log data 505. For example, identification firmware 345 might simply identify a block as suspect based on the sum of its counters 410-1 of FIG. 4 exceeding a predetermined threshold number.

Once identification firmware 345 has identified a block that is suspected of failing soon, verification firmware 350 may be invoked. Verification firmware 350 may use precise block-based data 405 of FIG. 4—specifically, block counters 410-1 that apply to the block suspected of failing soon—and approximate block-based data 605 to determine whether the block identified as a suspect block by identification firmware 345 is actually predicted to fail soon. Verification firmware 350 may use any desired approach to make this determination. For example, verification firmware 350 may implement a machine learning-based failure prediction model, such as Random Forest, Logistic Regression, Outlier Detection, Anomaly Detection, etc., which may be trained and its information for prediction (e.g., optimized weights) are already embedded in verification firmware 350. Verification firmware 350 may then produce result 610, which indicates whether the block suspected of failing soon by identification firmware 345 is actually predicted to fail soon.

Although FIG. 6 shows identification firmware 345 as generating approximate block-based data 605 from device-based log data 505, embodiments of the inventive concept may have other components produce approximate block-based data 605. For example, verification firmware 350 may take device-based log data 505 and produce approximate block-based data 605 itself.

Note that identification firmware 345 and verification firmware 350 have different functions. Identification firmware 345 merely identifies a block that is suspected to fail soon. Identification firmware 345 could be used in isolation (that is, every block that is suspected of failing soon could simply be assumed to fail soon). But such an approach would result in many blocks being retired from operation that might still operate properly for a long time. Identification firmware 345 might be thought of as analogous to the police arresting a suspect for committing a crime: the fact that the suspect is arrested does not automatically mean the suspect is guilty.

On the other hand, verification firmware 350 may be thought of as analogous to the criminal trial, returning either a guilty or innocent verdict. Verification firmware 350 makes the final judgment whether a particular block should actually be retired from use. Taking the extra step to verify that the block is actually ready for retirement avoids blocks from being retired too early.

It is also worth noting what computations are actually needed, both to identify a block as suspect and to verify the block is ready for retirement. Identification of a block as suspect may be done with a simple comparison of the number of errors that have occurred in that block relative to a threshold. This computation is typically very quick and simple to perform, and does not require the complex operations of the prior to analyze the block to see if the block is predicted to fail soon, and therefore ready for retirement.

Verification firmware 350 may involve more computation than identification firmware 345. But verification firmware 350 may be executed only after a block has been identified as suspect. This condition prevents verification firmware 350 from being executed repeatedly for many blocks, which as discussed above may exceed the available computational resources of SSD 115 of FIG. 1. It is far preferable to invoke verification firmware 350 as needed for individual suspect blocks than to be constantly checking every block with intense computations to determine if any block should be retired. Thus, the use of both identification firmware 345 and verification firmware 350 achieve the objectives of providing fine-grained block failure prediction without imposing the computational requirements to implement fine-grained block failure prediction.

Figure 7A:
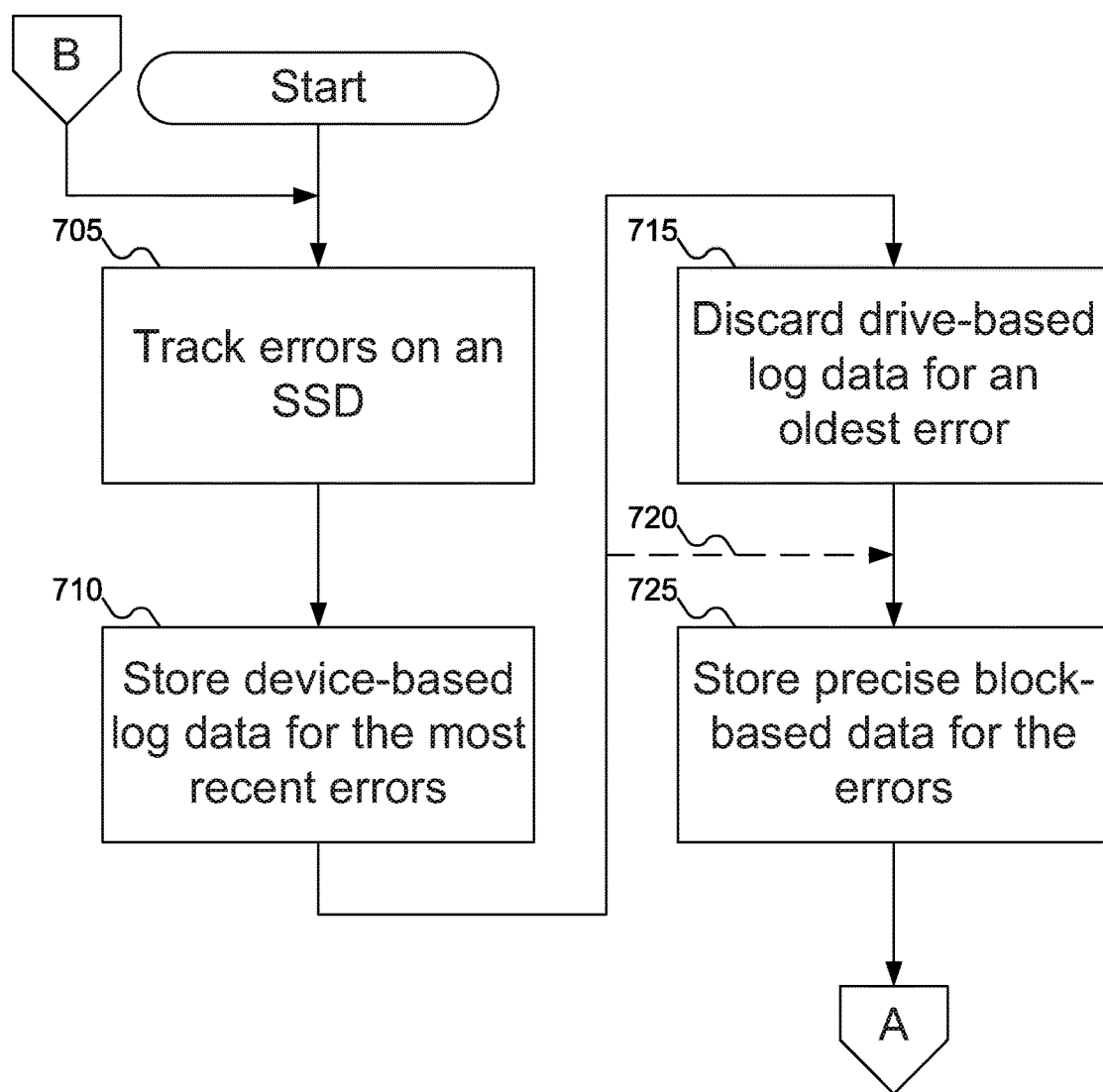
FIGS. 7A-7B show a flowchart of an example procedure to determine whether a block is expected to fail, according to an embodiment of the inventive concept.
Figure 7B:
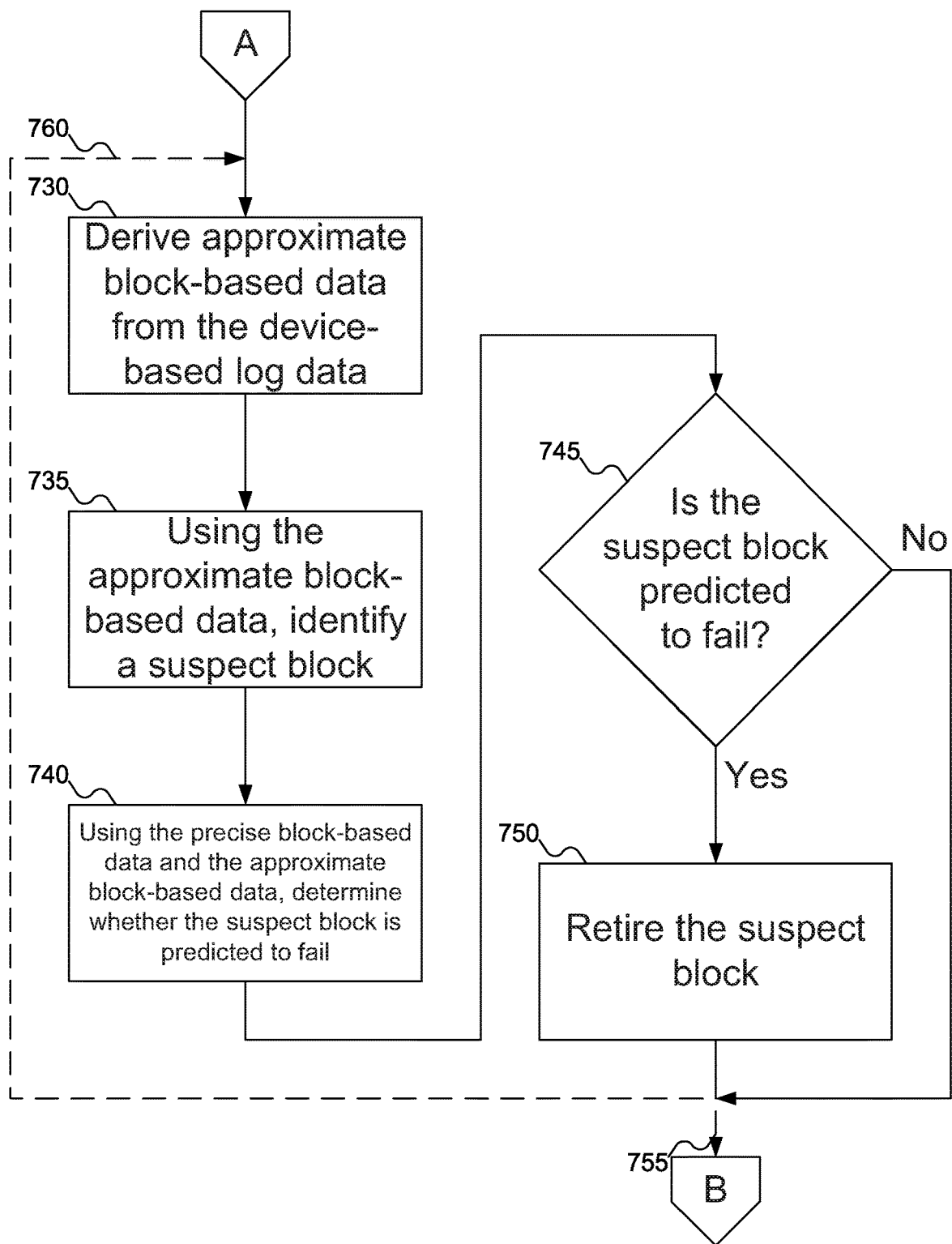

FIGS. 7A-7B show a flowchart of an example procedure to determine whether a block is expected to fail, according to an embodiment of the inventive concept. In FIG. 7A, at block 705, SSD 115 of FIG. 1 may track errors that have occurred in blocks 330 and 330 of FIG. 3. At block 710, SSD 115 of FIG. 1 may store device-based log data 505 of FIG. 5 in metadata storage 340 of FIG. 3. At block 715, SSD 115 of FIG. 1 may discard drive-based log data 505 of FIG. 5 for an oldest error. Block 715 may be omitted if there is no drive-based log data 505 of FIG. 5 for an oldest error to be discarded, as shown by dashed line 720. At block 725, SSD 115 of FIG. 1 may store precise block-based data 405 of FIG. 4 in metadata storage 340 of FIG. 3.

At block 730 (FIG. 7A), SSD 115 of FIG. 1 may derive approximate block-based data 605 of FIG. 6. As discussed above with reference to FIG. 6, approximate block-based data 605 of FIG. 6 may be derived by identification firmware 345 of FIG. 3, verification firmware 350 of FIG. 3, or by some other component of SSD 115 of FIG. 1 (for example, by SSD controller 310 of FIG. 3).

At block 735, identification firmware 345 of FIG. 3 may identify a block suspected of failing soon. As discussed above with reference to FIG. 6, identification firmware 345 may identify the block using approximate block-based data 605 of FIG. 6, device-based log data 505 of FIG. 5, or other data. At block 740, verification firmware 350 of FIG. 3 may verify whether the suspected block is actually predicted to fail. As discussed above with reference to FIG. 6, verification firmware 350 of FIG. 5 may make this determination using approximate block-based data 605 of FIG. 6, precise block-based data 405 of FIG. 4, device-based log data 505 of FIG. 5, or other data, and may do so using any desired algorithm, such as a machine learning-based failure prediction model, which may use a Random Forest algorithm, a Logistic Regression algorithm, an Outlier Detection algorithm, an Anomaly Detection algorithm, or any other desired algorithm.

At block 745, verification firmware 350 of FIG. 3 may determine whether the suspected block is actually predicted to fail soon. If so, then at block 750 verification firmware 350 of FIG. 3 may retire the suspected block. Retiring the suspected block may include copying any valid data currently stored in the block to other blocks (and updating any tables that identify where those data are stored) and marking the block so that SSD 115 of FIG. 1 does not write any new data to that block. For example, verification firmware 350 of FIG. 5 may mark each block as containing invalid data but somehow block any garbage collection logic from selecting the block for garbage collection.

At this point, whether verification firmware 350 of FIG. 3 has retired the suspected block or not, control may return to any of several points. Control may return to block 705 to track a new error that has occurred in SSD 115 of FIG. 3, as shown by dashed line 755. Or, control may return to block 730 to scan SSD 115 of FIG. 3 for new blocks suspected of failing soon, as shown by dashed line 760. The former approach might be used in systems that scan for suspect blocks after a predetermined number of errors have occurred; the latter approach might be used in systems that scan for suspect blocks after a predetermined interval of time has elapsed. Control may also end outright.

In the above discussion, there is one implicit assumption: that the chance of an error occurring in any particular block within SSD 115 of FIG. 1 is equal to the change of an error occurring in any other block. But what if that assumption were not true? What if different flash chips in SSD 115 of FIG. 1 were used for different purposes, or if SSD 115 of FIG. 1 included more than one type of flash storage? In such situations, one portion of SSD 115 of FIG. 1, or one type of flash storage, might dominate the errors reported, leaving in use blocks in the other type of flash storage that might be predicted to fail.

Figure 8:
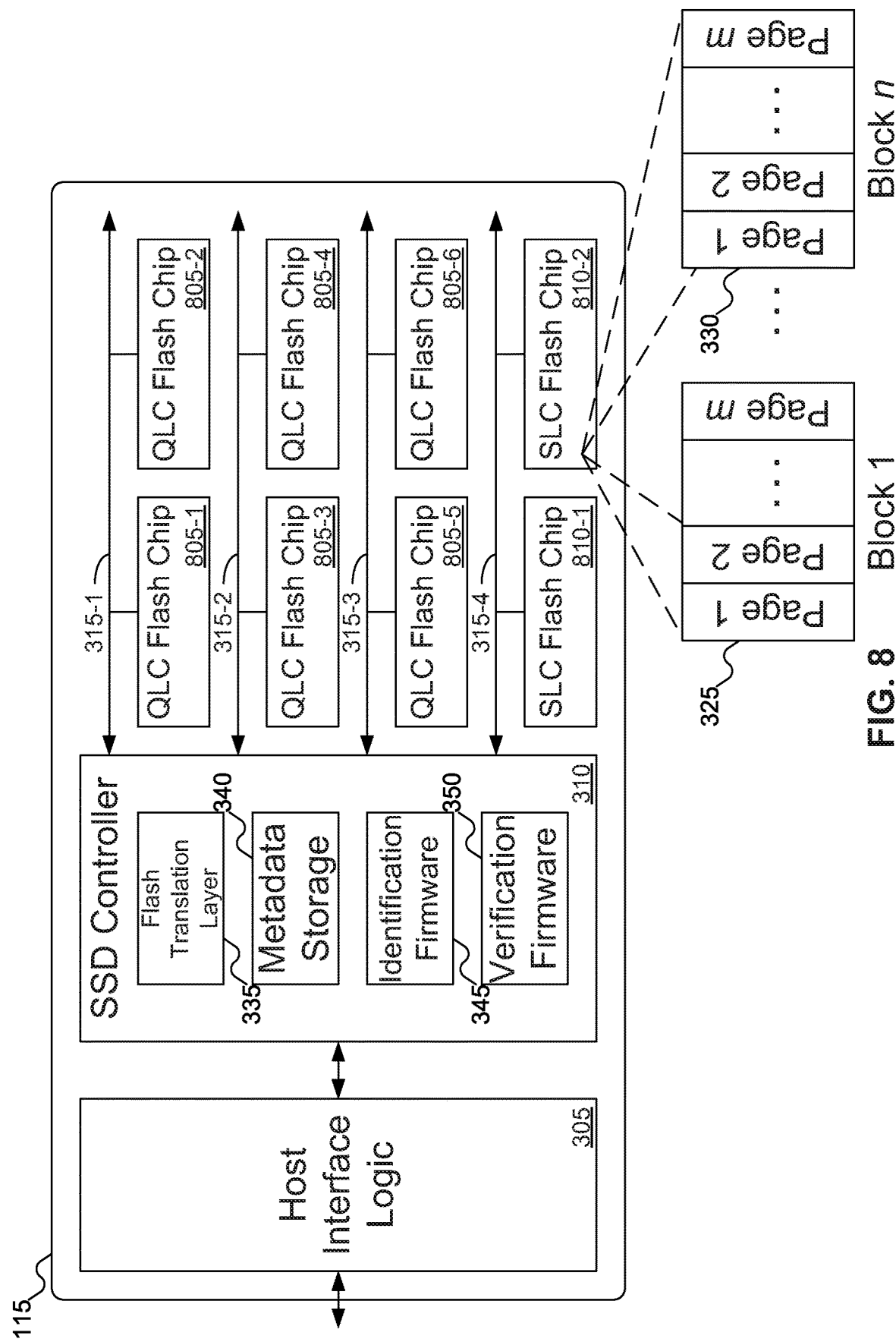
FIG. 8 shows details of the SSD of FIG. 1, using two different types of Not-AND (NAND) flash storage.

To address such concerns, the above discussion may be modified. FIG. 8 shows details of SSD 115 of FIG. 1, using two different types of NAND flash storage. In FIG. 8, SSD 115 is similar to SSD 115 in FIG. 3, except that some of the flash chips are Quad-Level Cell (QLC) flash chips (for example, flash chips 805-1, 805-2, 805-3, 805-4, 805-5, and 805-6), while other flash chips are Single-Level Cell (SLC) flash chips (such as flash chips 810-1 and 810-2).

The reason SSD 115 of FIG. 8 may include two different types of NAND flash chips is due to their different operating characteristics. QLC flash chips may hold more information per cell than SLC flash chips (4 bits vs. 1 bit), meaning that more information may be stored in a single QLC flash chip than in an SLC flash chip of comparable size (or alternatively, more SLC flash chips may be needed to store the same amount of data as a single QLC flash chip). But compared with SLC flash chips, QLC flash chips have a lower endurance: the number of write-erase cycles a QLC flash chip may undergo before failures may occur may be lower for QLC flash chips than for SLC flash chips. For example, an SLC flash chip might be able to undergo 100,000 write-erase cycles before failures might occur, whereas a QLC flash chip might only be able to undergo 100 write-erase cycles before failures might occur. SLC flash chips may also operate with a higher latency (that is, a faster response time). Thus, SSD 115 might use SLC flash chips 810-1 and 810-2 as a caching layer to pre-fetch data expected to be read soon from QLC flash chips 805-1 through 805-6 and to buffer data being written to QLC flash chips 805-1 through 805-6. In short, QLC flash chips 805-1 through 805-6 and SLC flash chips 810-1 and 810-2 may experience different access patterns and workloads, which may result in different error rates between the two types of flash storage.

There may be other differences between QLC flash chips 805-1 through 805-6 and SLC flash chips 810-1 and 810-2 that may have nothing to do with how the flash chips are used. For example, different flash chips may have different error characteristics and different error correcting mechanisms. Even though a block in a flash chip may experience an error, that error may be recoverable depending on the error correcting mechanism being used. Whether such an error is tracked by SSD 115 (as described above and below) may depend on implementation. On the one hand, the error was not fatal (since the error correcting mechanism was able to recover from the error), so the error might not be tracked. On the other hand, since an error did occur (regardless of whether or not the error was recoverable), the block error counters may be incremented appropriately and an error added to the error history table.

While FIG. 8 shows SSD 115 as including six QLC flash chips 805-1 through 805-6 and two SLC flash chips 810-1 and 810-2, embodiments of the inventive concept may support any number of flash chips (zero or more) of each storage type. In addition, each flash chip may support any number (zero or more) of blocks: flash chips of different storage types may include different numbers of blocks (and indeed, different flash chips of the same storage type may include different numbers of block as well).

While FIG. 8 shows SSD 115 as including two different types of NAND flash, embodiments of the inventive concept may extend to other implementations: for example, storage devices that use more than two different types of flash storage (such as SLC flash chips, Multi-Level Cell (MLC) flash chips, Triple-Level Cell (TLC) flash chips, QLC flash chips, and Penta-Level Cell (PLC) flash chips), storage devices that use other storage technologies (such as NOR flash), storage devices that use two different versions (that may have different performance characteristics) of a single type of flash storage, storage devices that use a single type of storage, but with different usages (such as different workflows), or any combination thereof. Whenever the discussion below refers to a "storage type", the term is intended to mean a particular type of flash chip (or other type of storage), a particular version of a type of flash chip, or a flash chip used in a particular manner that is different from other flash chips in the storage device. Thus, in the embodiment shown in FIG. 8, QLC may be considered a first storage type, and SLC may be considered a second storage type.

Finally, although the discussion above and below focuses on SSD 115 of FIG. 8, embodiments of the inventive concept may include other storage devices beyond SSDs. Any reference to an SSD, such as SSD 115 of FIG. 8, may be understood to include other storage devices.

Figure 9:
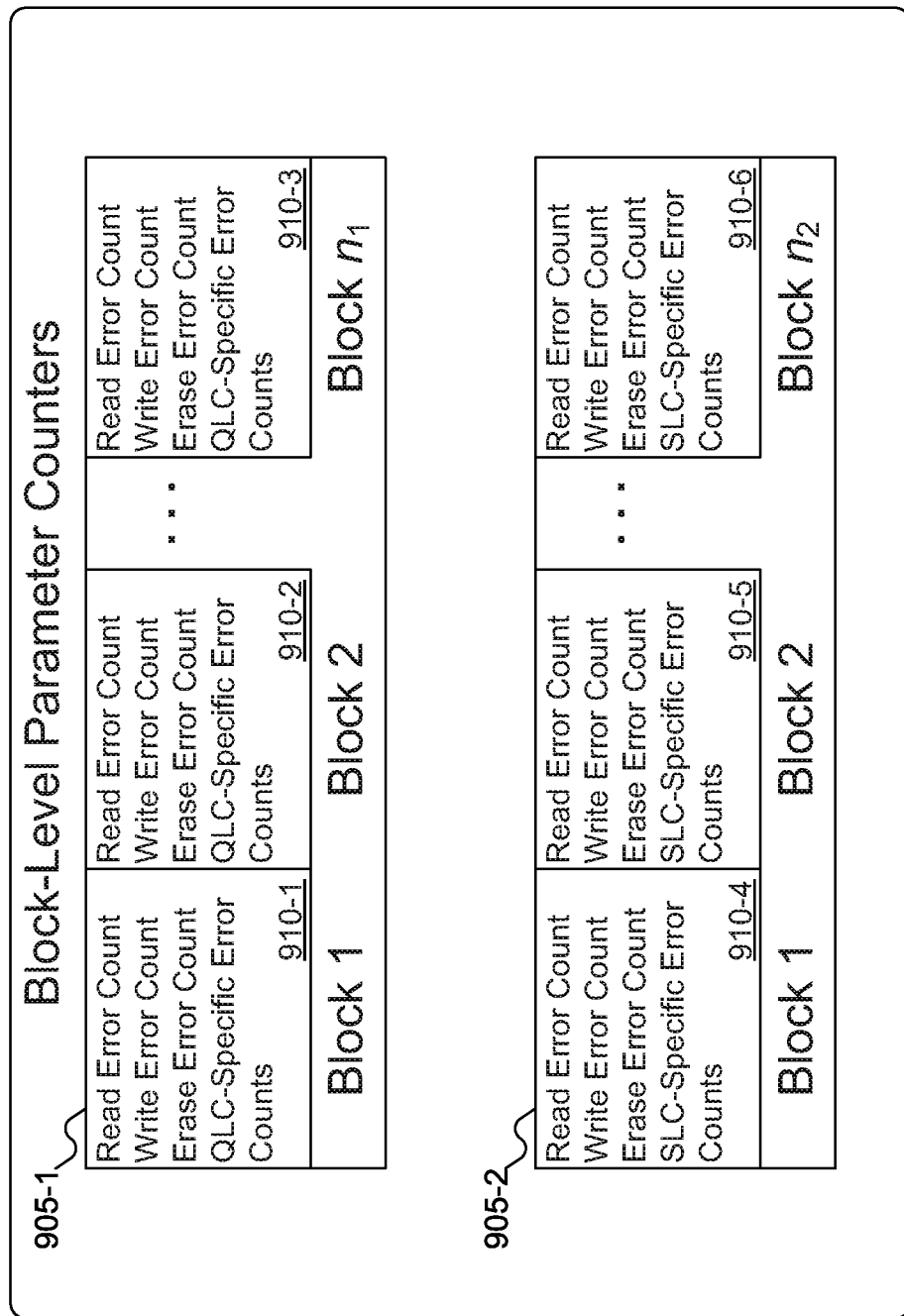
FIG. 9 shows example block-based data that may be used by the SSD of FIG. 8 in one embodiment of the inventive concept.

FIG. 9 shows example block-based data that may be used by SSD 115 of FIG. 8 in one embodiment of the inventive concept. In FIG. 9, because there are different storage types in SSD 115 of FIG. 8, different information may be tracked for blocks of different storage types. Thus, SSD 115 of FIG. 8 may store block-level parameters counters 905-1 for blocks in QLC flash chips 805-1 through 805-6 of FIG. 8, and block-level parameters counters 905-2 for block in SLC flash chips 810-1 and 1510-2 of FIG. 8.

Similar to the block-level parameter counters 405 of FIG. 4, block-level parameter counters 905-1 and 905-2 may include counters 910-1, 910-2, 910-3, 910-4, 910-5, and 910-6, which may include the number of read errors, the number of write errors, and the number of erase errors that have occurred for the corresponding blocks. But in addition, counters 910-1 through 910-3 may include error counters that are specific to QLC flash media, and counters 910-4 through 910-6 may include error counters that are specific to SLC flash media. These QLC- and SLC-specific error counters may include information that were considered device-level parameters for SSD 115 of FIG. 8 (which only included media of a single type), or they may include information that is specific to the individual blocks of the QLC flash chips and the SLC flash chips, but which are not necessarily tracked for blocks in the other storage type. (Of course, for counters that span all blocks in a single storage type, such information may be stored in the device-level parameters, as discussed with reference to FIG. 10 below, rather than in the individual block counters 910-1 through 910-6.)

Because SSD 115 of FIG. 8 may include different numbers of blocks of each storage type, the number of block counters stored in block-level parameter counters 905-1 and 905-2 may differ. Thus, for example, there might be, for example, 750,000 blocks in QLC flash chips 805-1 through 805-6 of FIG. 8 and 250,000 blocks in SLC flash chips 810-1 and 810-2. Thus, the number of counters in QLC block-level parameters 905-1 may differ from the number of counters in SLC block-level parameters 905-2.

Figure 10:
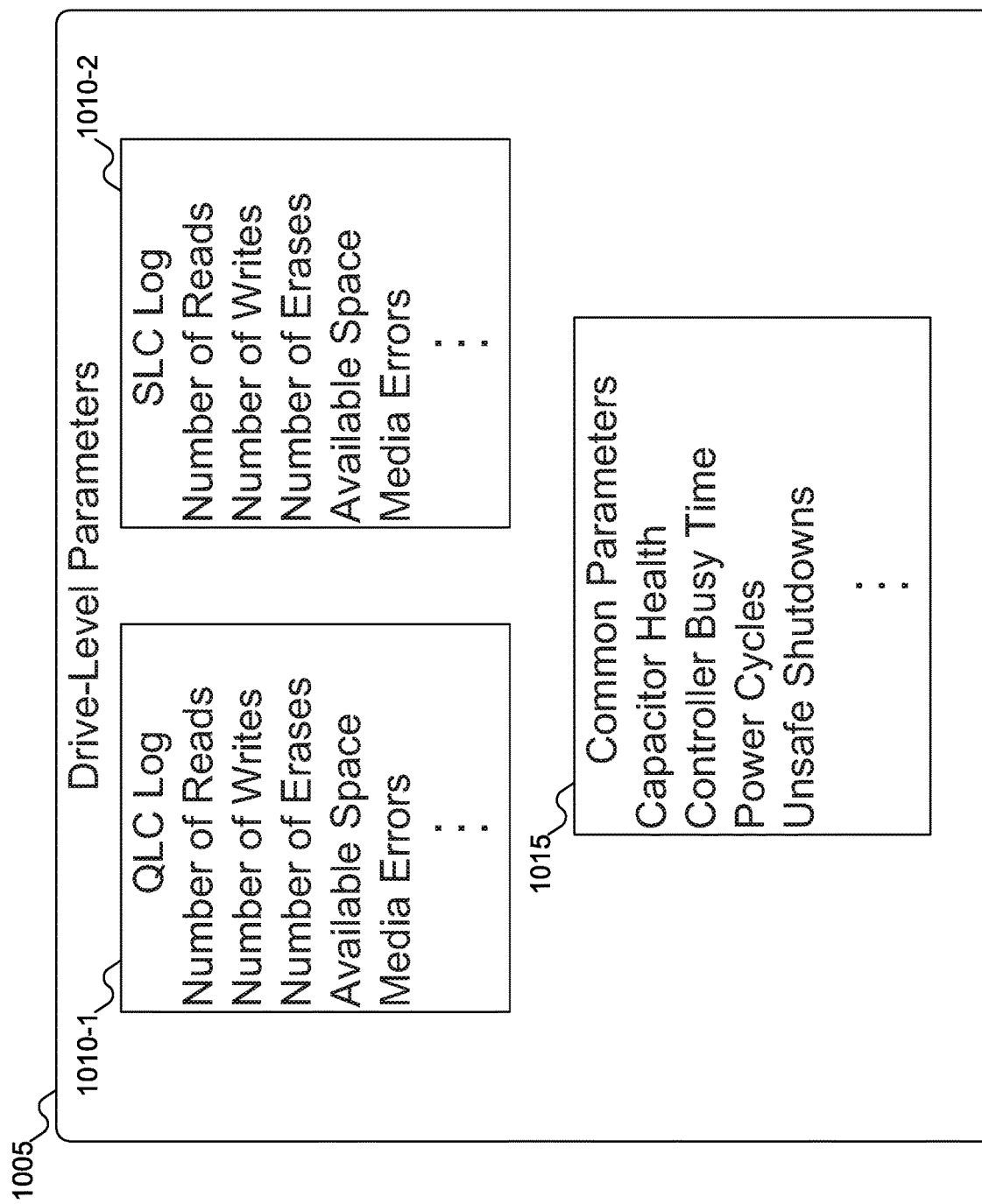
FIG. 10 shows device-based log data that may be used by the SSD of FIG. 8 in one embodiment of the inventive concept.

FIG. 10 shows device-based log data that may be used by SSD 115 of FIG. 8 in one embodiment of the inventive concept. In FIG. 10, drive-level parameters are shown. But whereas SSD 115 of FIG. 1 may include a single set of drive-level parameters (some of which are shown in SMART log data 515-1 of FIG. 5), drive-level parameters 1005 may include separate logs for QLC media and SLC media. That is, QLC log 1010-1 may store information that relates to QLC media, and SLC log 1010-2 may store information that relates to SLC media. Note that while QLC log 1010-1 and SLC log 1010-2 appear to have similar parameters, the values for these parameters may differ. For example, the number of reads stored in QLC log 1010-1 may represent the number of read operations from blocks in QLC flash chips 805-1 through 805-6 of FIG. 8, whereas the number of reads stored in SLC log 1010-2 may represent the number of read operations from blocks in SLC flash chips 810-1 and 810-2 of FIG. 8. Because the values may differ, the parameters may be stored in separate logs for each storage type, even though the parameter name may be the same.

Drive-level parameters 1005 may also include common parameters 1015. Common parameters 1015 may represent parameters whose value is the same for all storage types. For example, the number of power cycles for SSD 115 of FIG. 8 is the same for all blocks, whether in QLC flash chips 805-1 through 805-6 of FIG. 8 or in SLC flash chips 810-1 and 810-2. Thus, these parameters may be stored in a common area, rather than stored separately in QLC log 1010-1 and SLC log 1010-2. Note, however, that these common parameters could be stored once in each of QLC log 1010-1 and SLC log 1010-2, with the only consequence being a doubling of the amount of storage used by these parameters (and because the parameters are stored twice, two updates may be performed instead of one for each parameter as the values change).

In contrast with the embodiment of the inventive concept shown in FIG. 10, in some embodiments of the inventive concept a unified device log may be used, similar to that shown in FIG. 5. But because SSD 115 of FIG. 8 may include multiple storage types, the question is how much each storage type may contribute to the overall value for a single parameter.

For example, consider the description of SSD 115 of FIG. 8 above. If SLC flash chips 810-1 and 810-2 of FIG. 8 are used as a cache for QLC flash chips 805-1 through 805-6 of FIG. 8, then data may be read from blocks in QLC flash chips 805-1 through 805-6 of FIG. 8, only to be stored in SLC flash chips 810-1 and 810-2 of FIG. 8, from which they may be read upon request from the host. In short, data is being pre-fetched from QLC flash chips 805-1 through 805-6 of FIG. 8 into SLC flash chips 810-1 and 810-2 of FIG. 8.

But pre-fetching is an attempt to predict what data was requested. If SSD 115 of FIG. 8 is perfect in its pre-fetch operations, then every read operation for data from QLC flash chips 805-1 through 805-6 of FIG. 8 may have a corresponding read operation from SLC flash chips 810-1 and 810-2 of FIG. 8. In that case, half of all read operations are from QLC flash chips 805-1 through 805-6 of FIG. 8, and the other half of all read operations are from SLC flash chips 810-1 and 810-2 of FIG. 8. On the other hand, if SSD 115 of FIG. 8 is completely unsuccessful in its prefetch operations (that is, SSD 115 of FIG. 8 never successfully prefetches data from QLC flash chips 805-1 through 805-6 of FIG. 8 into SLC flash chips 810-1 and 810-2 of FIG. 8), then all read operations are from QLC flash chips 805-1 through 805-6 of FIG. 8: none are from SLC flash chips 810-1 and 810-2 of FIG. 8. Thus, the actual usage patterns (workflow) for QLC flash chips 805-1 through 805-6 of FIG. 8 vs. SLC flash chips 810-1 and 810-2 of FIG. 8 may impact how much each storage type may contribute to overall parameters, such as number of read operations.

The same may be true of other operations: for example, if SLC flash chips 810-1 and 810-2 of FIG. 8 are used as a write buffer for QLC flash chips 805-1 through 805-6 of FIG. 8, then some write operations are attributable to SLC flash chips 810-1 and 810-2 of FIG. 8 and some write operations are attributable to QLC flash chips 805-1 through 805-6 of FIG. 8.

An embodiment of the inventive concept may calculate the relative contribution of a storage type to a particular parameter based on tunable variables $\alpha$ and $\beta$, which may be used relative to the number of write operations and read operations to each storage type and to the storage device as a whole. For example, for a given parameter X, the contribution of each storage type to the overall parameter may be calculated using the following formulae $$QLC_X = X \times \left(\alpha_X \times \left(\frac{QLC_{Writes}}{Drive_{Writes}}\right) + \left(\beta_X \times \left(\frac{QLC_{Reads}}{Drive_{Reads}}\right)\right)\right) \text{ and}$$

$$SLC_X = X \times \left(\alpha_X \times \left(\frac{SLC_{Writes}}{Drive_{Writes}}\right) + \left(\beta_X \times \left(\frac{SLC_{Reads}}{Drive_{Reads}}\right)\right)\right).$$

In other words, given counters for the number of read operations and write operations performed on the storage device as a whole and for the QLC and SLC media individually, the relative contribution of each storage type to any unified parameter (such as number of erase operations or controller busy time) may be calculated using appropriately tuned values for $\alpha$ and $\beta$. Since the unified parameters may not track the number of write operations and read operations for each storage type separately, SSD 115 of FIG. 8 may track this information as well, but the amount of storage for such information is only a few bytes (for example, 4 bytes for each such counter). This additional information—the storage-type specific counters and the values for $\alpha$ and $\beta$ for each parameter—may be stored, for example, in metadata storage 340 of FIG. 8.

The values for $\alpha$ and $\beta$ may depend on the parameter being considered. For example, the number of erase operations depends strictly on the number of write operations (read operations do not affect how many write operations may be performed), so for the number of erase operations parameter $\alpha$ may be set to 1 and $\beta$ may be set to 0. On the other hand, the controller is equally busy for each read and write operation, so for the controller busy time parameter $\alpha$ may be set to 0.5 and $\beta$ may be set to 0.5. In some embodiments of the inventive concept, $\alpha$ and $\beta$ may be subject to the constraints that each is a positive value ranging from 0 to 1, and that the sum of $\alpha$ and $\beta$ should equal 1; in other embodiments of the inventive concept these constraints may be relaxed.

The selection of the values for $\alpha$ and $\beta$ may be fixed in advance for each parameter, or the selection may be adjustable by the end user. For example, some customers may configure SLC flash chips 810-1 and 810-2 of FIG. 8 to act as a read cache for QLC flash chips 805-1 through 805-6 of FIG. 8; other customers may configure SLC flash chips 810-1 and 810-2 of FIG. 8 to act as a write buffer for QLC flash chips 805-1 through 805-6 of FIG. 8; still other customers may configure SLC flash chips 810-1 and 810-2 of FIG. 8 to act as both a read cache and a write buffer for QLC flash chips 805-1 through 805-6 of FIG. 8; and still other customers may configure SLC flash chips 810-1 and 810-2 of FIG. 8 to act as ordinary storage just like QLC flash chips 805-1 through 805-6 of FIG. 8. For each of these use cases, the values for $\alpha$ and $\beta$, and the customer may configure the values for $\alpha$ and $\beta$ appropriate to their use case. (The customer might choose the values for $\alpha$ and $\beta$ that they prefer, or SSD 115 of FIG. 8 may include tables of values for $\alpha$ and $\beta$ that represent pre-selected values for different use cases, and the customer may then select the use case that best matches how the customer uses SSD 115 of FIG. 8.)

Finally, the above formulae describe the relative contributions of each storage type. The resulting values may be divided by the number of blocks for the corresponding storage type to determine the relative contribution of each block within the storage type to the parameter as calculated for the storage type, similar to the calculation of the approximate block-based log data as described above with reference to FIG. 5.

While the above discussion focuses on two storage types, embodiments of the inventive concept may extend to more than two storage types. Variables $\alpha$ and $\beta$ may be the same even with more than two storage types.

Figure 11:
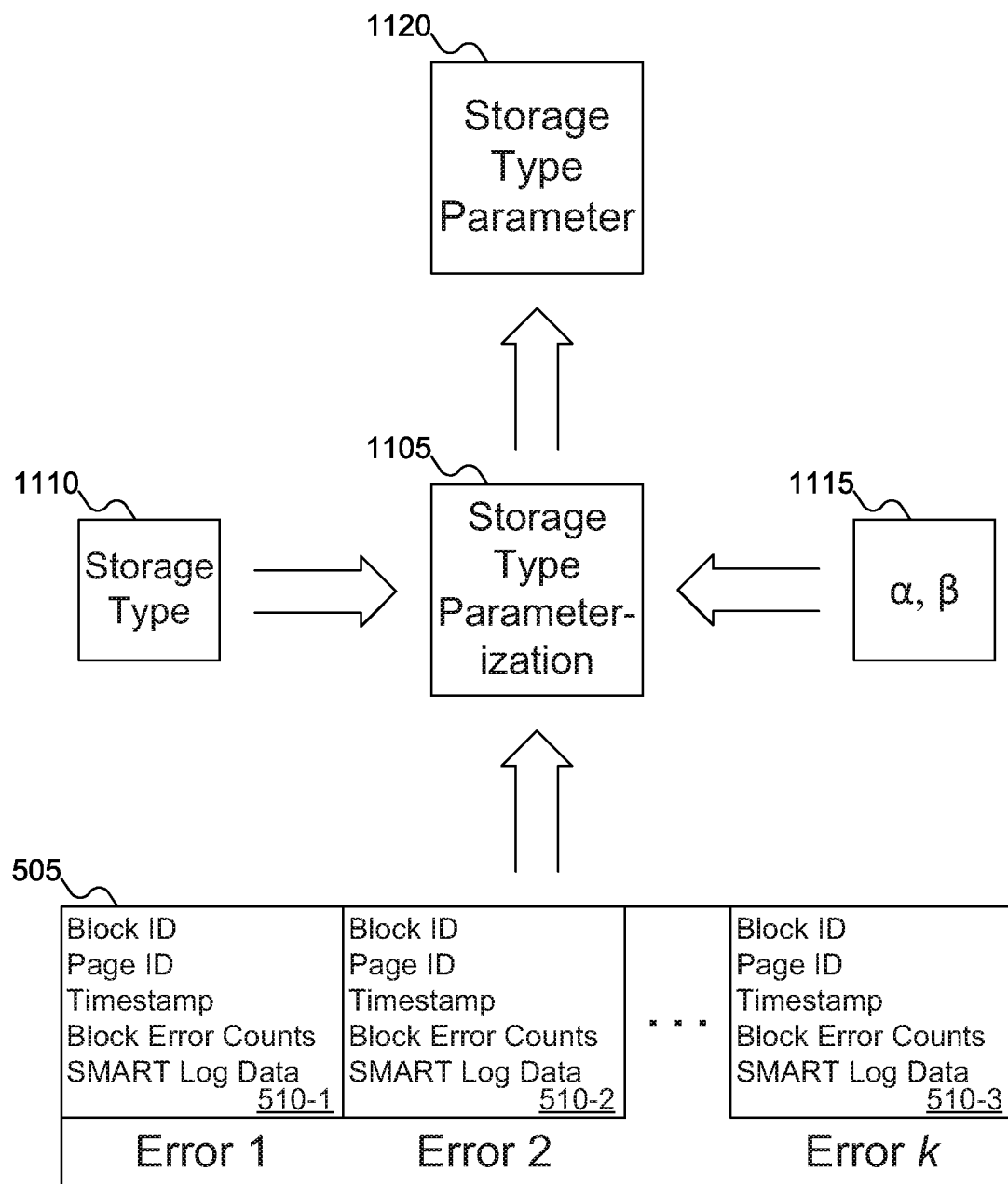
FIG. 11 shows using the device-based log data of FIG. 5 along with other information to determine a storage type parameter, according to another embodiment of the inventive concept.

FIG. 11 shows using the device-based log data 502 of FIG. 5 along with other information to determine a storage type parameter, according to another embodiment of the inventive concept. In FIG. 11, storage type parameterization 1105 may use device-based log data 505, storage type 1110, and variables 1115. Given this information, storage type parameter 1120 may be calculated, representing the approximate relative contribution of a particular storage type to the overall value of the parameter.

Figure 12:
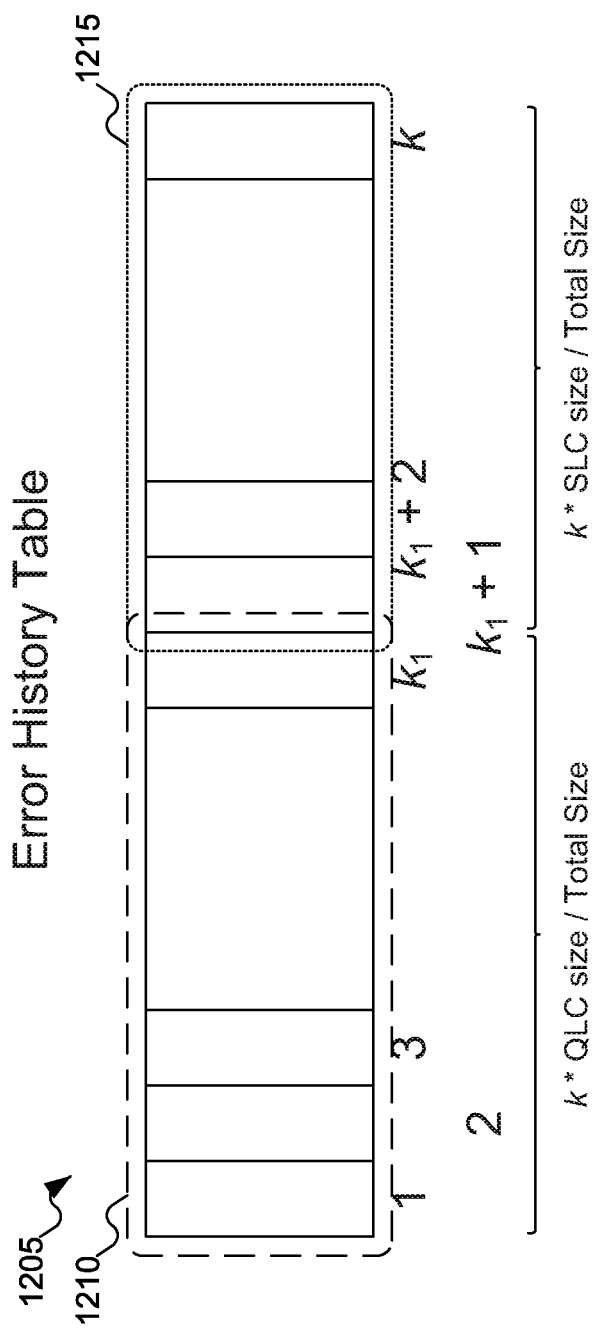
FIG. 12 shows an error history table that may be used by the SSD of FIG. 8, divided into portions for different storage types, according to an embodiment of the inventive concept.

FIG. 12 shows an error history table that may be used by SSD 115 of FIG. 8, divided into portions for different storage types, according to an embodiment of the inventive concept. In FIG. 12, error history table 1205 is shown. Error history table 1205 may store information about individual errors, such as the k most recent errors as discussed above with reference to FIG. 5. But as noted previously, where SSD 115 of FIG. 8 includes multiple storage types, it may happen that the errors occurring in one storage type may dominate the most recent errors, staring the other storage type(s) from identification of blocks that may be predicted to fail.

For example, consider again SSD 115 of FIG. 8, with QLC flash chips 805-1 through 805-6 of FIG. 8 and SLC flash chips 810-1 and 810-2 of FIG. 8. Because there are three times as many flash chips as SLC flash chips, it may be expected that ¾ of the errors would occur in QLC flash chips 805-1 through 805-6 of FIG. 8. Factoring in that QLC flash chips 805-1 through 805-6 of FIG. 8 may experience errors at a rate 1000 times greater than SLC flash chips 810-1 and 810-2 of FIG. 8, and it would be reasonable to expect that approximately 3000 errors will occur in QLC flash chips 805-1 through 805-6 of FIG. 8 for every 1 error in SLC flash chips 810-1 and 810-2 of FIG. 8. If error history table 1205 only includes space for 100 errors, for example, then it is unlikely for any blocks in SLC flash chips 810-1 and 810-2 of FIG. 8 to be identified as likely to fail.

A solution is to divide error history table 1205 into multiple portions, each portion storing errors for a particular storage type. The number of errors in error history table 1205 reserved for each storage type may be selected in any desired manner. For example, the size of each storage type relative to the overall size of the storage device may be used. Thus, for example, if QLC flash chips 805-1 through 805-6 of FIG. 8 represent 75% of the size of SSD 115 of FIG. 8 and SLC flash chips 810-1 and 810-2 of FIG. 8 represent 25% of the size of SSD 115 of FIG. 8, then 75% of error history table 1205 may be reserved for errors in QLC flash chips 805-1 through 805-6 of FIG. 8 (as shown by portion 1210), and 25% of error history table 1205 may be reserved for errors in SLC flash chips 810-1 and 810-2 of FIG. 8 (as shown by portion 1215).

In this context, "size" may refer to the number of chips, the overall capacity, the number of blocks, or any other measure of the different storage types, as desired. For example, since SSD 115 of FIG. 8 includes six QLC flash chips and two SLC flash chips, there are a total of eight flash chips in SSD 115 of FIG. 8, of which 75% are QLC flash chips and 25% are SLC flash chips. Thus, 75% of error history table 1205 may be reserved for errors in QLC flash chips 805-1 through 805-6 of FIG. 8, and 25% of error history table 1205 may be reserved for errors in SLC flash chips 810-1 and 810-2 of FIG. 8.

Alternatively, if, for example, QLC flash chips 805-1 through 805-6 of FIG. 8 offer a total reported storage of 900 GB and SLC flash chips 810-1 and 810-2 of FIG. 8 offer a total reported storage of 100 GB, then QLC flash chips 805-1 through 805-6 of FIG. 8 offer 90% of the capacity of SSD 115 of FIG. 1, and SLC flash chips 810-1 and 810-2 of FIG. 8 offer 10% of the capacity of SSD 115 of FIG. 1. Thus, 90% of error history table 1205 may be reserved for errors in QLC flash chips 805-1 through 805-6 of FIG. 8, and 10% of error history table 1205 may be reserved for errors in SLC flash chips 810-1 and 810-2 of FIG. 8.

Alternatively, if, for example, QLC flash chips 805-1 through 805-6 of FIG. 8 include a total of 800,000 blocks and SLC flash chips 810-1 and 810-2 of FIG. 8 include a total of 200,000 blocks, then QLC flash chips 805-1 through 805-6 of FIG. 8 include 80% of the blocks in SSD 115 of FIG. 1, and SLC flash chips 810-1 and 810-2 of FIG. 8 include 20% of the blocks in SSD 115 of FIG. 1. Thus, 80% of error history table 1205 may be reserved for errors in QLC flash chips 805-1 through 805-6 of FIG. 8, and 20% of error history table 1205 may be reserved for errors in SLC flash chips 810-1 and 810-2 of FIG. 8.

Figure 13A:
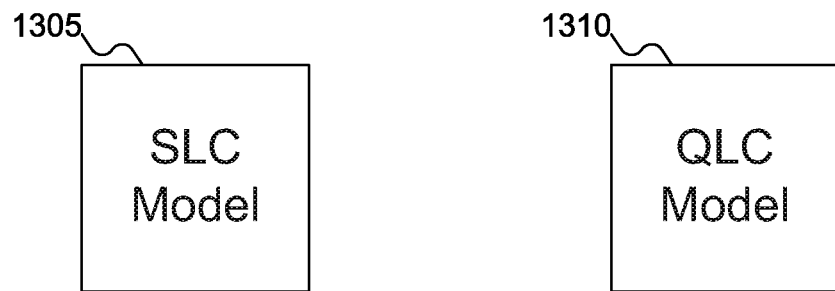
FIGS. 13A-13B show different models that may be used to verify whether a block in a particular storage type in the SSD of FIG. 8 is predicted to fail, according to embodiments of the inventive concept.
Figure 13B:
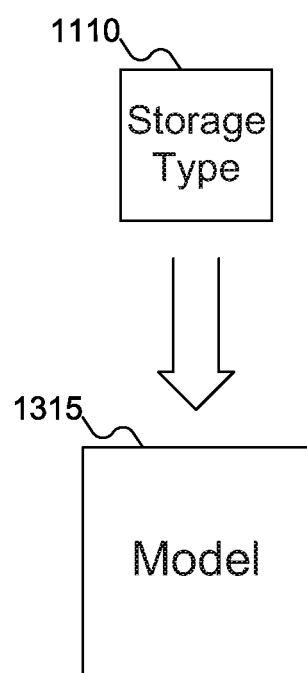

FIGS. 13A-13B show different models that may be used to verify whether a block in a particular storage type in SSD 115 of FIG. 8 is predicted to fail, according to embodiments of the inventive concept. In FIG. 13A, models 1305 and 1310 are shown. Model 1305 may be used to verify whether an identified SLC block is predicted to fail, whereas model 1310 may be used to verify whether an identified QLC block is predicted to fail. Since SLC and QLC media have different error characteristics, such as different write/erase cycles, different read latency/speed, different error correction/recovery, different workloads, and/or different error rates, a block of one storage type might be predicted to fail after a particular error whereas a block of the other storage type might not be predicted to fail. By using separate models (example of which, as discussed above, may include Random Forest, Logistic Regression, Outlier Detection, Anomaly Detection, etc.) for different storage types, each model may be trained and/or designed specifically for the storage type to which they apply.

On the other hand, in FIG. 13B, model 1315 is shown. In FIG. 13B, rather than using different models for different storage types, a single model may be used. This model may receive storage type 1110 as an input, which may be used by model 1315 to determine whether a particular block is expected to fail. In this manner, a single model may be used to predict whether blocks from more than one storage type are predicted to fail: model 1315 may effectively operate as either of models 1305 and 1310 of FIG. 13A, depending on storage type 1110 received as input.

Figure 14A:
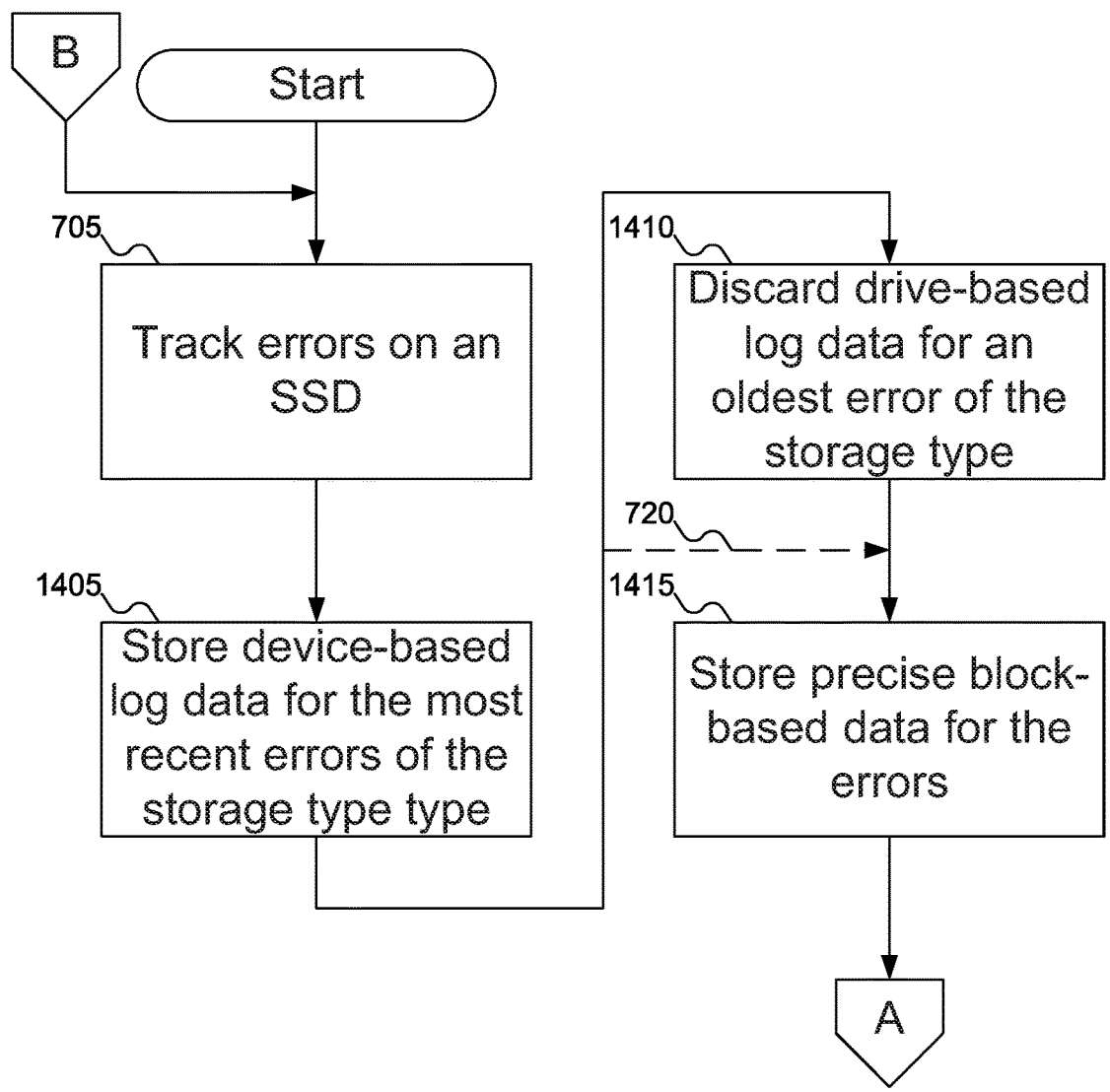
FIGS. 14A-14B show a flowchart of an example procedure to determine whether a block is expected to fail in the SSD of FIG. 8, according to embodiments of the inventive concept.
Figure 14B:
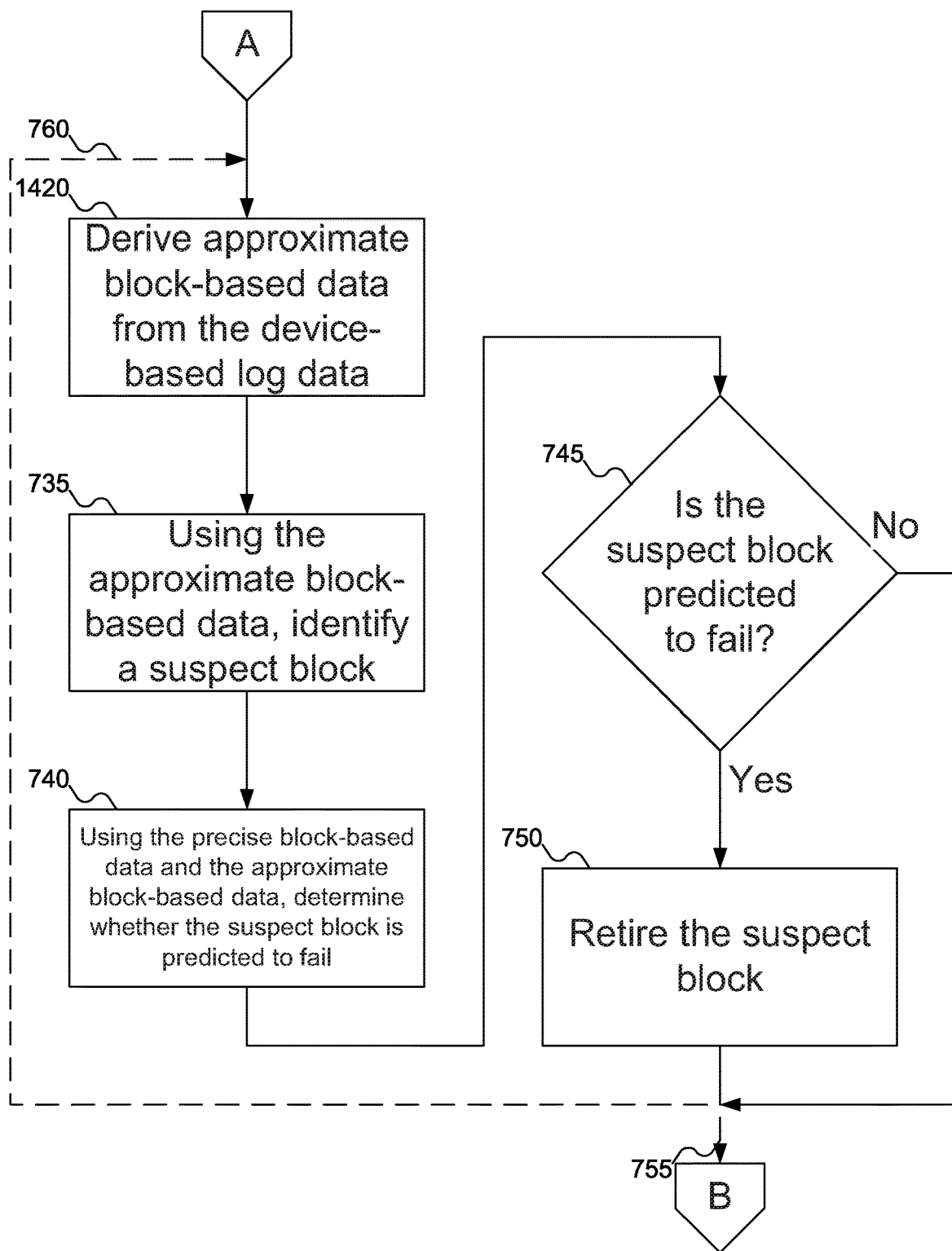

FIGS. 14A-14B show a flowchart of an example procedure to determine whether a block is expected to fail in SSD 115 of FIG. 8, according to embodiments of the inventive concept. FIGS. 14A-14B are similar to FIGS. 7A-7B, and similar reference numbers are used where the described operations are similar.

In FIG. 14A, at block 705, SSD 115 of FIG. 8 may track errors that have occurred in blocks 330 and 330 of FIG. 8. Block 705 may track errors in both (or all, if more there are more than two) storage types. At block 1405, SSD 115 of FIG. 8 may store device-based log data 505 of FIG. 5 or device-based log data 1005 of FIG. 10 in metadata storage 340 of FIG. 8. At block 1410, SSD 115 of FIG. 8 may discard drive-based log data 505 of FIG. 5 device-based log data 1005 of FIG. 10 for an oldest error of the same storage type. Note that since there may be more than one storage type, the oldest error in error history table 1205 of FIG. 12 may be of a different storage type, and therefore may be retained: the oldest error for the storage type from error history table 1205 of FIG. 12 may be discarded. Block 1410 may be omitted if there is no drive-based log data 505 of FIG. 5 or device-based log data 1005 of FIG. 10 for an oldest error to be discarded, as shown by dashed line 720. At block 1415, SSD 115 of FIG. 8 may store precise block-based data 405 of FIG. 4 in metadata storage 340 of FIG. 8. In addition, at block 1415 SSD 115 of FIG. 8 may store other precise block-based data that is dependent on the storage type in metadata storage 340 of FIG. 8: for example, block-level parameters counters 905-1 and 905-2 of FIG. 9.

At block 1420 (FIG. 14B), SSD 115 of FIG. 8 may derive approximate block-based data 605 of FIG. 6. As discussed above with reference to FIGS. 6 and 10-11, approximate block-based data 605 of FIG. 6 may be derived by identification firmware 345 of FIG. 8, verification firmware 350 of FIG. 8, or by some other component of SSD 115 of FIG. 8

(for example, by SSD controller 310 of FIG. 8). In addition, storage type parameterization 1105 of FIG. 11 may be used in determining approximate block-based data 605 of FIG. 6 for a parameter whose value is unified for two or more storage types. Because SSD 115 of FIG. 8 may include multiple storage types, the approximate block-based data may be in proportion to the size of the individual storage types, rather than across all blocks in SSD 115 of FIG. 8.

At block 735, identification firmware 345 of FIG. 8 may identify a block suspected of failing soon. As discussed above with reference to FIG. 6, identification firmware 345 may identify the block using approximate block-based data 605 of FIG. 6, device-based log data 505 of FIG. 5, or other data. At block 740, verification firmware 350 of FIG. 8 may verify whether the suspected block is actually predicted to fail. As discussed above with reference to FIG. 6, verification firmware 350 of FIG. 5 may make this determination using approximate block-based data 605 of FIG. 6, precise block-based data 405 of FIG. 4, device-based log data 505 of FIG. 5, or other data, and may do so using any desired algorithm, such as a machine learning-based failure prediction model, which may use a Random Forest algorithm, a Logistic Regression algorithm, an Outlier Detection algorithm, an Anomaly Detection algorithm, or any other desired algorithm.

At block 745, verification firmware 350 of FIG. 8 may determine whether the suspected block is actually predicted to fail soon. If so, then at block 750 verification firmware 350 of FIG. 8 may retire the suspected block. Retiring the suspected block may include copying any valid data currently stored in the block to other blocks (and updating any tables that identify where those data are stored) and marking the block so that SSD 115 of FIG. 8 does not write any new data to that block. For example, verification firmware 350 of FIG. 5 may mark each block as containing invalid data but somehow block any garbage collection logic from selecting the block for garbage collection.

At this point, whether verification firmware 350 of FIG. 8 has retired the suspected block or not, control may return to any of several points. Control may return to block 705 to track a new error that has occurred in SSD 115 of FIG. 8, as shown by dashed line 755. Or, control may return to block 1420 to scan SSD 115 of FIG. 8 for new blocks suspected of failing soon, as shown by dashed line 760. The former approach might be used in systems that scan for suspect blocks after a predetermined number of errors have occurred; the latter approach might be used in systems that scan for suspect blocks after a predetermined interval of time has elapsed. Control may also end outright.

Figure 15:
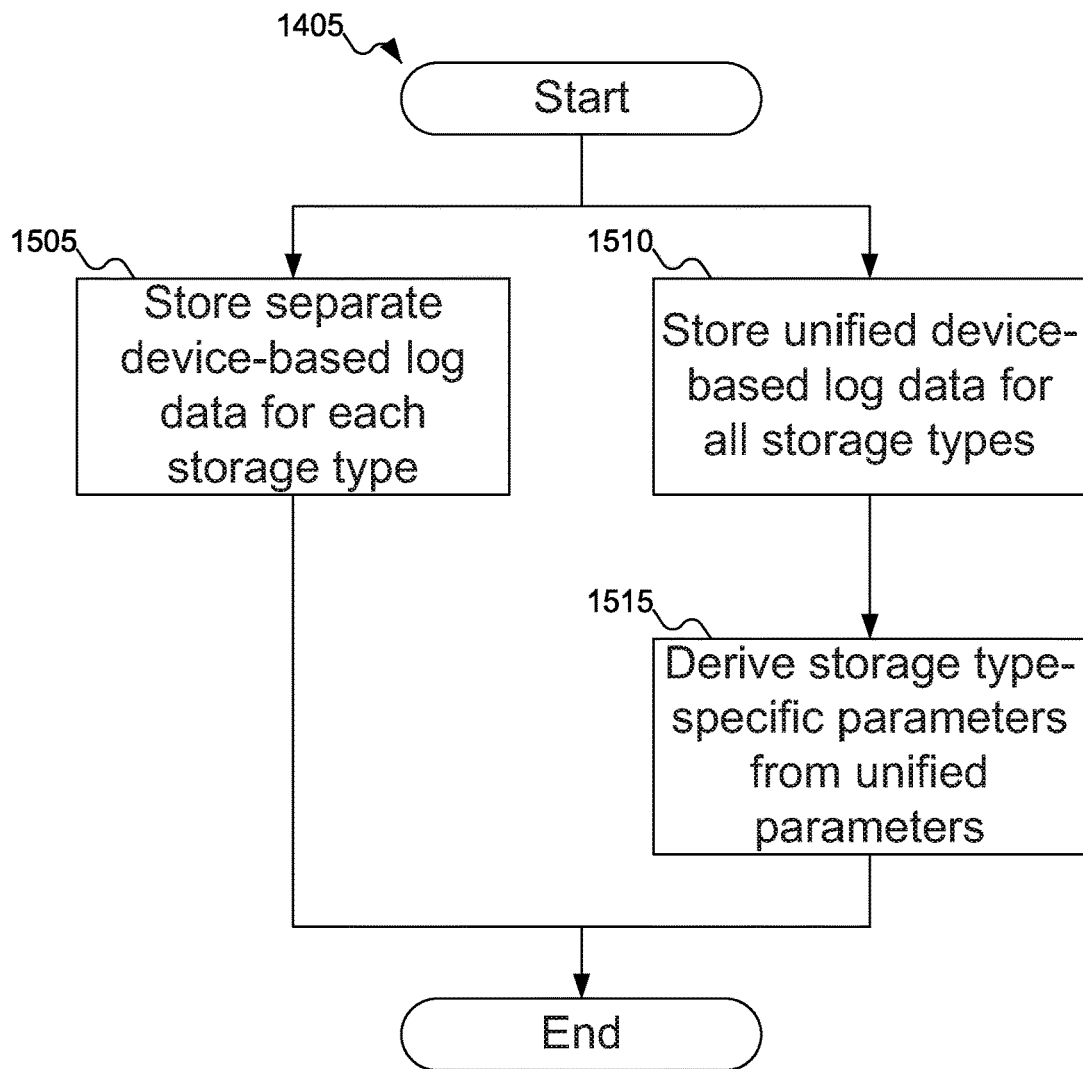
FIG. 15 shows a flowchart of an example procedure for storing device-based log data in the SSD of FIG. 8, according to embodiments of the inventive concept.

FIG. 15 shows a flowchart of an example procedure for storing device-based log data 1005 in SSD 115 of FIG. 8, according to embodiments of the inventive concept. In FIG. 15, at block 1505, SSD 115 of FIG. 8 may store separate block-based log data, such as storage type logs 1010-1 and 1010-2 of FIG. 10, for each storage type. Alternatively, at block 1510, SSD 115 of FIG. 8 may store a unified device-based log data (such as device-based log data 505 of FIG. 5) for all storage types, and at block 1515 storage type parameterization 1105 of FIG. 11 may determine parameters for each storage type based on the unified device-based log data.

Figure 16:
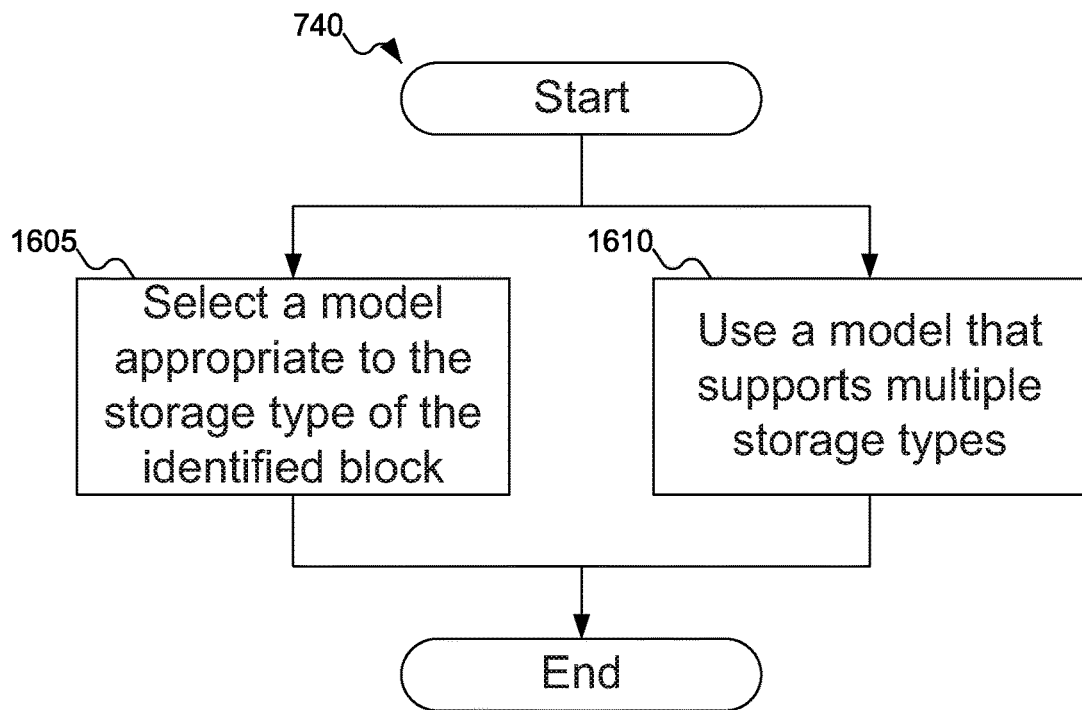
FIG. 16 shows a flowchart of an example procedure for using models to verify whether a predicted block is expected to fail in the SSD of FIG. 8, according to embodiments of the inventive concept.

FIG. 16 shows a flowchart of an example procedure for using models to verify whether a predicted block is expected to fail in the SSD of FIG. 8, according to embodiments of the inventive concept. At block 1605, verification firmware 350 of FIG. 8 may select appropriate model 1305 or 1310 of FIG. 13 to use based on the storage type of the block suspected of failing soon. Alternatively, at block 1610, verification firmware 350 of FIG. 8 may use model 1315 of FIG. 13 that may support multiple storage types: verification firmware 350 of FIG. 3 may provide model 1315 of FIG. 8 storage type 1110 of FIG. 11 to assist in determining whether the block is predicted to fail appropriate to the storage type.

In FIGS. 7A-7B and 14A-16, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. First, embodiments of the inventive concept permit for a fine-grained block failure prediction, not offered by conventional systems. Second, embodiments of the inventive concept avoid the possibility of high false positive identifications of blocks predicted to fail by distinguishing between identification of a suspect block and verification that the suspect block is actually predicted to fail. Third, embodiments of the inventive concept enable verifying that a suspect block is predicted to fail without requiring the significant computational resources associated with such predictions in conventional systems. Fourth, embodiments of the inventive concept permit verifying whether a particular block is predicted to fail without having to determine whether other blocks are also predicted to fail, thereby minimizing the computational resources used. Fifth, even if a storage device includes more than one storage type, embodiments of the inventive concept may verify whether a particular block is predicted to fail factoring in the block's storage type.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
flash storage for data, the flash storage organized into a plurality of blocks;
a controller to manage reading data from and writing data to the flash storage;
metadata storage to store device-based log data for errors in the SSD; and
an identification circuit configured to identify a suspect block in the plurality of blocks responsive to the device-based log data.

Statement 2. An embodiment of the inventive concept includes the SSD according to statement 1, wherein the metadata storage stores device-based log data for only a most recent set of the errors in the SSD.

Statement 3. An embodiment of the inventive concept includes the SSD according to statement 2, wherein an oldest entry in the device-based log data is discarded when a new error occurs.

Statement 4. An embodiment of the inventive concept includes the SSD according to statement 2, wherein:
the metadata storage is further configured to store precise block-based data regarding the errors in the SSD; and
the SSD further comprises a verification circuit configured to determine whether the suspect block is predicted to fail responsive to both the precise block-based data and the device-based log data.

Statement 5. An embodiment of the inventive concept includes the SSD according to statement 4, wherein the verification circuit is executed only for the suspect block.

Statement 6. An embodiment of the inventive concept includes the SSD according to statement 4, wherein the verification circuit is not executed for any block in the plurality of blocks other than the suspect block.

Statement 7. An embodiment of the inventive concept includes the SSD according to statement 4, wherein the verification circuit is configured to retire the suspect block responsive to the precise block-based data and the device-based log data.

Statement 8. An embodiment of the inventive concept includes the SSD according to statement 4, wherein the precise block-based data includes counters for the number of errors for each block in the plurality of blocks.

Statement 9. An embodiment of the inventive concept includes the SSD according to statement 8, wherein the counters for the number of errors for each block in the plurality of blocks includes a read error counter, a write error counter, and an erase error counter for each block in the plurality of blocks.

Statement 10. An embodiment of the inventive concept includes the SSD according to statement 8, wherein the precise block-based data includes the counters for the number of errors for each block in the plurality of blocks since the SSD was manufactured.

Statement 11. An embodiment of the inventive concept includes the SSD according to statement 4, wherein the verification circuit implements one of a Random Forest, a Logistic Regression, an Outlier Detection analysis, and an Anomaly Detection analysis to the precise block-based data and the device-based log data.

Statement 12. An embodiment of the inventive concept includes the SSD according to statement 4, wherein the identification circuit is configured to identify a suspect block in the plurality of blocks responsive to both the device-based log data and the precise block-based data.

Statement 13. An embodiment of the inventive concept includes the SSD according to statement 2, wherein the identification circuit is configured to derive approximate block-based data from the device-based log data.

Statement 14. An embodiment of the inventive concept includes the SSD according to statement 13, wherein the identification circuit is configured to determine the approximate block-based data as an average block-based data from the device-based log data.

Statement 15. An embodiment of the inventive concept includes the SSD according to statement 2, wherein the SSD is configured to execute the identification circuit periodically.

Statement 16. An embodiment of the inventive concept includes the SSD according to statement 15, wherein the SSD is configured to execute the identification circuit at regular time intervals.

Statement 17. An embodiment of the inventive concept includes the SSD according to statement 15, wherein the SSD is configured to execute the identification circuit after a regular number of errors have occurred.

Statement 18. An embodiment of the inventive concept includes a Solid State Drive (SSD), comprising:

flash storage for data, the flash storage organized into a plurality of blocks;

a controller to manage reading data from and writing data to the flash storage;

metadata storage to store precise block-based data for errors in the SSD; and an identification circuit configured to identify a suspect block in the plurality of blocks responsive to the precise block-based data.

Statement 19. An embodiment of the inventive concept includes the SSD according to statement 18, wherein the identification circuit is configured to identify the suspect block responsive to a total error count for the suspect block in the precise block-based data.

Statement 20. An embodiment of the inventive concept includes the SSD according to statement 18, wherein the precise block-based data includes counters for the number of errors for each block in the plurality of blocks.

Statement 21. An embodiment of the inventive concept includes the SSD according to statement 20, wherein the counters for the number of errors for each block in the plurality of blocks includes a read error counter, a write error counter, and an erase error counter for each block in the plurality of blocks.

Statement 22. An embodiment of the inventive concept includes the SSD according to statement 21, wherein the identification circuit is configured to calculate a total error count from the read error counter, the write error counter, and the erase error counter for the suspect block and to compare the total error counter with a threshold.

Statement 23. An embodiment of the inventive concept includes the SSD according to statement 18, wherein the SSD is configured to execute the identification circuit periodically.

Statement 24. An embodiment of the inventive concept includes the SSD according to statement 23, wherein the SSD is configured to execute the identification circuit at regular time intervals.

Statement 25. An embodiment of the inventive concept includes the SSD according to statement 23, wherein the SSD is configured to execute the identification circuit after a regular number of errors have occurred.

Statement 26. An embodiment of the inventive concept includes a method, comprising:

tracking errors in a Solid State Drive (SSD), the SSD including a plurality of blocks;

storing device-based log data about the errors in the SSD; and identifying a suspect block in the plurality of blocks responsive to the device-based log data.

Statement 27. An embodiment of the inventive concept includes the method according to statement 26, wherein storing device-based log data about the errors in the SSD includes storing the device-based log data for only a most recent set of the errors in the SSD.

Statement 28. An embodiment of the inventive concept includes the method according to statement 27, wherein storing device-based log data about the errors in the SSD further includes discarding an oldest entry in the device-based log data when a new error occurs in the SSD.

Statement 29. An embodiment of the inventive concept includes the method according to statement 27, further comprising:

storing precise block-based data regarding the errors in the SSD; and once the suspect block has been identified, determining whether the suspect block is predicted to fail responsive to both the precise block-based data and the device-based log data.

Statement 30. An embodiment of the inventive concept includes the method according to statement 29, wherein determining whether the suspect block is predicted to fail responsive to both the precise block-based data and the device-based log data includes determining whether the suspect block is predicted to fail responsive to both the precise block-based data and the device-based log data for only the suspect block.

Statement 31. An embodiment of the inventive concept includes the method according to statement 29, wherein determining whether the suspect block is predicted to fail responsive to both the precise block-based data and the device-based log data includes not determining whether any other block is predicted to fail.

Statement 32. An embodiment of the inventive concept includes the method according to statement 29, further comprising retiring the suspect block based at least in part on the precise block-based data and the device-based log data.

Statement 33. An embodiment of the inventive concept includes the method according to statement 29, wherein storing precise block-based data regarding the errors in the SSD includes storing counters for the number of errors for each block in the plurality of blocks.

Statement 34. An embodiment of the inventive concept includes the method according to statement 33, wherein storing counters for the number of errors for each block in the plurality of blocks includes storing a read error counter, a write error counter, and an erase error counter for each block in the plurality of blocks.

Statement 35. An embodiment of the inventive concept includes the method according to statement 33, wherein storing counters for the number of errors for each block in the plurality of blocks includes storing the counters for the number of errors for each block in the plurality of blocks since the SSD was manufactured.

Statement 36. An embodiment of the inventive concept includes the method according to statement 29, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 37. An embodiment of the inventive concept includes the method according to statement 29, wherein determining whether the suspect block is predicted to fail responsive to both the precise block-based data and the device-based log data includes determining whether the suspect block is predicted to fail responsive to spatially local information for the suspect block.

Statement 38. An embodiment of the inventive concept includes the method according to statement 27, wherein identifying a suspect block in the plurality of blocks responsive to the device-based log data includes deriving approximate block-based data from the device-based log data.

Statement 39. An embodiment of the inventive concept includes the method according to statement 38, wherein deriving approximate block-based data from the device-based log data includes determining average block-based data from the device-based log data.

Statement 40. An embodiment of the inventive concept includes the method according to statement 27, further comprising periodically identifying a new suspect block in the plurality of blocks responsive to the device-based log data.

Statement 41. An embodiment of the inventive concept includes the method according to statement 40, wherein periodically identifying a new suspect block in the plurality of blocks responsive to the device-based log data includes checking the plurality of blocks for the suspect block at regular time intervals.

Statement 42. An embodiment of the inventive concept includes the method according to statement 40, wherein periodically identifying a new suspect block in the plurality of blocks responsive to the device-based log data includes checking the plurality of blocks for the suspect block after a regular number of errors have occurred.

Statement 43. An embodiment of the inventive concept includes a method, comprising:
tracking errors in a Solid State Drive (SSD), the SSD including a plurality of blocks;
storing precise block-based data about the errors in the SSD; and
identifying a suspect block in the plurality of blocks responsive to the precise block-based data.

Statement 44. An embodiment of the inventive concept includes the method according to statement 43, wherein identifying a suspect block in the plurality of blocks responsive to the precise block-based data includes:
computing a total error count for the suspect block from the precise block-based data; and
comparing the total error count with a threshold error count.

Statement 45. An embodiment of the inventive concept includes the method according to statement 44, wherein computing a total error count for the suspect block from the precise block-based data includes:
determining a read error counter, a write error counter, and an erase error counter for the suspect block from the precise block-base data; and
totaling the read error counter, the write error counter, and the erase error counter to compute the total error count for the suspect block.

Statement 46. An embodiment of the inventive concept includes the method according to statement 43, further comprising periodically identifying a new suspect block in the plurality of blocks responsive to the device-based log data.

Statement 47. An embodiment of the inventive concept includes the method according to statement 46, wherein periodically identifying a new suspect block in the plurality of blocks responsive to the device-based log data includes checking the plurality of blocks for the suspect block at regular time intervals.

Statement 48. An embodiment of the inventive concept includes the method according to statement 46, wherein periodically identifying a new suspect block in the plurality of blocks responsive to the device-based log data includes checking the plurality of blocks for the suspect block after a regular number of errors have occurred.

Statement 49. An embodiment of the inventive concept includes an article, comprising a non-transitory storage medium, the non-transitory storage medium having stored thereon instructions that, when executed by a machine, result in:
tracking errors in a Solid State Drive (SSD), the SSD including a plurality of blocks;
storing device-based log data about the errors in the SSD; and
identifying a suspect block in the plurality of blocks responsive to the device-based log data.

Statement 50. An embodiment of the inventive concept includes the article according to statement 49, wherein storing device-based log data about the errors in the SSD includes storing the device-based log data for only a most recent set of the errors in the SSD.

Statement 51. An embodiment of the inventive concept includes the article according to statement 50, wherein storing device-based log data about the errors in the SSD further includes discarding an oldest entry in the device-based log data when a new error occurs in the SSD.

Statement 52. An embodiment of the inventive concept includes the article according to statement 50, wherein the non-transitory storage medium has stored thereon further instructions that, when executed by the machine, result in:
storing precise block-based data regarding the errors in the SSD; and
once the suspect block has been identified, determining whether the suspect block is predicted to fail responsive to both the precise block-based data and the device-based log data.

Statement 53. An embodiment of the inventive concept includes the article according to statement 52, wherein determining whether the suspect block is predicted to fail responsive to both the precise block-based data and the device-based log data includes determining whether the suspect block is predicted to fail responsive to both the precise block-based data and the device-based log data for only the suspect block.

Statement 54. An embodiment of the inventive concept includes the article according to statement 52, wherein determining whether the suspect block is predicted to fail responsive to both the precise block-based data and the device-based log data includes not determining whether any other block is predicted to fail.

Statement 55. An embodiment of the inventive concept includes the article according to statement 52, wherein the non-transitory storage medium has stored thereon further instructions that, when executed by the machine, result in retiring the suspect block based at least in part on the precise block-based data and the device-based log data.

Statement 56. An embodiment of the inventive concept includes the article according to statement 52, wherein storing precise block-based data regarding the errors in the SSD includes storing counters for the number of errors for each block in the plurality of blocks.

Statement 57. An embodiment of the inventive concept includes the article according to statement 56, wherein storing counters for the number of errors for each block in the plurality of blocks includes storing a read error counter, a write error counter, and an erase error counter for each block in the plurality of blocks.

Statement 58. An embodiment of the inventive concept includes the article according to statement 56, wherein storing counters for the number of errors for each block in the plurality of blocks includes storing the counters for the number of errors for each block in the plurality of blocks since the SSD was manufactured.

Statement 59. An embodiment of the inventive concept includes the article according to statement 52, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 60. An embodiment of the inventive concept includes the article according to statement 52, wherein determining whether the suspect block is predicted to fail responsive to both the precise block-based data and the device-based log data includes determining whether the suspect block is predicted to fail responsive to spatially local information for the suspect block.

Statement 61. An embodiment of the inventive concept includes the article according to statement 50, wherein identifying a suspect block in the plurality of blocks responsive to the device-based log data includes deriving approximate block-based data from the device-based log data.

Statement 62. An embodiment of the inventive concept includes the article according to statement 61, wherein deriving approximate block-based data from the device-based log data includes determining average block-based data from the device-based log data.

Statement 63. An embodiment of the inventive concept includes the article according to statement 50, wherein the non-transitory storage medium has stored thereon further instructions that, when executed by the machine, result in periodically identifying a new suspect block in the plurality of blocks responsive to the device-based log data.

Statement 64. An embodiment of the inventive concept includes the article according to statement 63, wherein periodically identifying a new suspect block in the plurality of blocks responsive to the device-based log data includes checking the plurality of blocks for the suspect block at regular time intervals.

Statement 65. An embodiment of the inventive concept includes the article according to statement 63, wherein periodically identifying a new suspect block in the plurality of blocks responsive to the device-based log data includes checking the plurality of blocks for the suspect block after a regular number of errors have occurred.

Statement 66. An embodiment of the inventive concept includes an article, comprising a non-transitory storage medium, the non-transitory storage medium having stored thereon instructions that, when executed by a machine, result in:

tracking errors in a Solid State Drive (SSD), the SSD including a plurality of blocks;

storing precise block-based data about the errors in the SSD; and identifying a suspect block in the plurality of blocks responsive to the precise block-based data.

Statement 67. An embodiment of the inventive concept includes the article according to statement 66, wherein identifying a suspect block in the plurality of blocks responsive to the precise block-based data includes:

computing a total error count for the suspect block from the precise block-based data; and comparing the total error count with a threshold error count.

Statement 68. An embodiment of the inventive concept includes the article according to statement 67, wherein computing a total error count for the suspect block from the precise block-based data includes:

determining a read error counter, a write error counter, and an erase error counter for the suspect block from the precise block-base data; and totaling the read error counter, the write error counter, and the erase error counter to compute the total error count for the suspect block.

Statement 69. An embodiment of the inventive concept includes the article according to statement 66, the non-transitory storage medium having stored thereon further instructions that, when executed by the machine, result in periodically identifying a new suspect block in the plurality of blocks responsive to the device-based log data.

Statement 70. An embodiment of the inventive concept includes the article according to statement 69, wherein periodically identifying a new suspect block in the plurality of blocks responsive to the device-based log data includes checking the plurality of blocks for the suspect block at regular time intervals.

Statement 71. An embodiment of the inventive concept includes the article according to statement 69, wherein periodically identifying a new suspect block in the plurality of blocks responsive to the device-based log data includes checking the plurality of blocks for the suspect block after a regular number of errors have occurred.

Statement 72. An embodiment of the inventive concept includes a storage device, comprising:

a first storage media to store a first data, the first storage media of a first storage type, the first storage media organized into at least two first blocks;

a second storage media to store a second data, the second storage media of a second storage type different from the first type, the second storage media organized into at least two second blocks;

a controller to manage reading data from and writing data to the first storage media and the second storage media;

metadata storage to store device-based log data for errors in the storage device, the drive-based log data including a first log data for the first storage media and a second log data for the second storage media; and an identification circuit configured to identify a suspect block in the at least two first blocks and the at least two second blocks responsive to the device-based log data.

Statement 73. An embodiment of the inventive concept includes the storage device according to statement 72, wherein the storage device includes a Solid State Drive (SSD).

Statement 74. An embodiment of the inventive concept includes the storage device according to statement 72, wherein:

the first storage type includes first error characteristics; and the second storage type includes second error characteristics, wherein the first error characteristics and the second error characteristics are different.

Statement 75. An embodiment of the inventive concept includes the storage device according to statement 72, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 76. An embodiment of the inventive concept includes the storage device according to statement 72, wherein the drive-based log data further includes:

a first most recent set of the errors in the first storage media in the storage device; and a second most recent set of errors in the second storage media in the storage device.

Statement 77. An embodiment of the inventive concept includes the storage device according to statement 76, wherein:

the first most recent set of the errors in the first storage media includes a first number of errors; and the second most recent set of the errors in the second storage media includes a second number of errors.

Statement 78. An embodiment of the inventive concept includes the storage device according to statement 77, wherein the first number of errors and the second number of errors are in proportion to a first capacity of the first storage media and a second capacity of the second storage media.

Statement 79. An embodiment of the inventive concept includes the storage device according to statement 77, wherein the first number of errors and the second number of errors are in proportion to a first number of blocks in the first storage media and a second number of blocks in the second storage media.

Statement 80. An embodiment of the inventive concept includes the storage device according to statement 76, wherein:

a first oldest entry in the first most recent set of the errors in the first storage media in the storage device is discarded when a first new error in the first storage media occurs; and a second oldest entry in the second most recent set of the errors in the second storage media in the storage device is discarded when a second new error in the second storage media occurs.

Statement 81. An embodiment of the inventive concept includes the storage device according to statement 76, wherein:

the metadata storage is further configured to store precise block-based data regarding the errors in the storage device; and the storage device further comprises a verification circuit configured to determine whether the suspect block is predicted to fail responsive to both the precise block-based data and the device-based log data.

Statement 82. An embodiment of the inventive concept includes the storage device according to statement 81, wherein the verification circuit includes a first model for the first storage type and a second model for the second storage type.

Statement 83. An embodiment of the inventive concept includes the storage device according to statement 81, wherein the verification circuit includes a model that may consider a selected storage type associated with the suspect block.

Statement 84. An embodiment of the inventive concept includes the storage device according to statement 81, wherein the verification circuit is executed only for the suspect block.

Statement 85. An embodiment of the inventive concept includes the storage device according to statement 81, wherein the verification circuit is not executed for any block in the first blocks or the second blocks other than the suspect block.

Statement 86. An embodiment of the inventive concept includes the storage device according to statement 81, wherein the verification circuit is configured to retire the suspect block responsive to the precise block-based data and the device-based log data.

Statement 87. An embodiment of the inventive concept includes the storage device according to statement 81, wherein the precise block-based data includes counters for the number of errors for each block in the first blocks and the second blocks.

Statement 88. An embodiment of the inventive concept includes the storage device according to statement 87, wherein the precise block-based data includes a first counter for the number of errors in the first storage media and a second counter for the number of errors in the second storage media.

Statement 89. An embodiment of the inventive concept includes the storage device according to statement 87, wherein the counters for the number of errors for each block in the first blocks and the second blocks includes a read error counter, a write error counter, and an erase error counter for each block in the first blocks and the second blocks.

Statement 90. An embodiment of the inventive concept includes the storage device according to statement 87, wherein the precise block-based data includes the counters for the number of errors for each block in the first blocks and the second blocks since the storage device was manufactured.

Statement 91. An embodiment of the inventive concept includes the storage device according to statement 81, wherein the verification circuit implements one of a Random Forest, a Logistic Regression, an Outlier Detection analysis, and an Anomaly Detection analysis to the precise block-based data and the device-based log data.

Statement 92. An embodiment of the inventive concept includes the storage device according to statement 81, wherein the identification circuit is configured to identify a suspect block in the first blocks and the second blocks responsive to both the device-based log data and the precise block-based data.

Statement 93. An embodiment of the inventive concept includes the storage device according to statement 76, wherein the identification circuit is configured to derive approximate block-based data from the device-based log data.

Statement 94. An embodiment of the inventive concept includes the storage device according to statement 93, wherein the identification circuit is configured to determine the approximate block-based data as an average block-based data from the device-based log data.

Statement 95. An embodiment of the inventive concept includes the storage device according to statement 94, wherein the identification circuit is configured to determine the approximate block-based data as an average block-based data for a selected storage type from the first storage type and the second storage type, the selected storage type associated with the suspected block.

Statement 96. An embodiment of the inventive concept includes the storage device according to statement 76, wherein the storage device is configured to execute the identification circuit periodically.

Statement 97. An embodiment of the inventive concept includes the storage device according to statement 96, wherein the storage device is configured to execute the identification circuit at regular time intervals.

Statement 98. An embodiment of the inventive concept includes the storage device according to statement 96, wherein the storage device is configured to execute the identification circuit after a regular number of errors have occurred.

Statement 99. An embodiment of the inventive concept includes a storage device, comprising:

a first storage media to store a first data, the first storage media of a first storage type, the first storage media organized into at least two first blocks;

a second storage media to store a second data, the second storage media of a second storage type different from the first type, the second storage media organized into at least two second blocks;

a controller to manage reading data from and writing data to the first storage media and the second storage media;

metadata storage to store precise block-based data for errors in the storage device, the precise block-based data for errors in the storage device including a first counter for a first number of errors in the first storage media and a second counter for a second number of errors in the second storage media; and an identification circuit configured to identify a suspect block in the first blocks and the second blocks responsive to the precise block-based data.

Statement 100. An embodiment of the inventive concept includes the storage device according to statement 99, wherein the storage device includes a Solid State Drive (SSD).

Statement 101. An embodiment of the inventive concept includes the storage device according to statement 99, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 102. An embodiment of the inventive concept includes the storage device according to statement 99, wherein the identification circuit is configured to identify the suspect block responsive to a total error count for the suspect block in the precise block-based data.

Statement 103. An embodiment of the inventive concept includes the storage device according to statement 99, wherein the precise block-based data includes counters for the number of errors for each block in the first blocks and the second blocks.

Statement 104. An embodiment of the inventive concept includes the storage device according to statement 103, wherein the counters for the number of errors for each block in the plurality of blocks includes a read error counter, a write error counter, and an erase error counter for each block in the first blocks and the second blocks.

Statement 105. An embodiment of the inventive concept includes the storage device according to statement 104, wherein the identification circuit is configured to calculate a total error count from the read error counter, the write error counter, and the erase error counter for the suspect block and to compare the total error counter with a threshold.

Statement 106. An embodiment of the inventive concept includes the storage device according to statement 99, wherein the storage device is configured to execute the identification circuit periodically.

Statement 107. An embodiment of the inventive concept includes the storage device according to statement 106, wherein the storage device is configured to execute the identification circuit at regular time intervals.

Statement 108. An embodiment of the inventive concept includes the storage device according to statement 106, wherein the storage device is configured to execute the identification circuit after a regular number of errors have occurred.

Statement 109. An embodiment of the inventive concept includes a method, comprising:

tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;

storing device-based log data about the errors in the storage device, the device-based log data including a first log data for the first storage media and a second log data for the second storage media; and identifying a suspect block in the first blocks and the second blocks responsive to the device-based log data.

Statement 110. An embodiment of the inventive concept includes the method according to statement 109, wherein the storage device includes a Solid State Drive (SSD).

Statement 111. An embodiment of the inventive concept includes the method according to statement 109, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 112. An embodiment of the inventive concept includes the method according to statement 109, wherein storing device-based log data about the errors in the storage device includes:

storing a first most recent set of the errors in the first storage media in the storage device; and storing a second most recent set of the errors in the second storage media in the storage device.

Statement 113. An embodiment of the inventive concept includes the method according to statement 112, wherein:

storing the first most recent set of the errors in the first storage media in the storage device includes discarding a first oldest entry in the first most recent set of the errors when a first new error occurs in the first storage media in the storage device; and storing the second most recent set of the errors in the second storage media in the storage device includes discarding a second oldest entry in the second most recent set of the errors when a second new error occurs in the second storage media in the storage device.

Statement 114. An embodiment of the inventive concept includes the method according to statement 112, further comprising:

storing precise block-based data regarding the errors in the storage device; and once the suspect block has been identified, determining whether the suspect block is predicted to fail responsive to both the precise block-based data and the device-based log data.

Statement 115. An embodiment of the inventive concept includes the method according to statement 114, wherein determining whether the suspect block is predicted to fail responsive to both the precise block-based data and the device-based log data includes selecting a model to determine whether the suspect block is predicted to fail, the model one of at least a first model for the first storage type and a second model for the second storage type.

Statement 116. An embodiment of the inventive concept includes the method according to statement 114, wherein determining whether the suspect block is predicted to fail responsive to both the precise block-based data and the device-based log data includes determining whether the suspect block is predicted to fail considering a selected storage type associated with the suspect block.

Statement 117. An embodiment of the inventive concept includes the method according to statement 114, wherein storing precise block-based data regarding the errors in the storage device includes:

storing a first counter for the number of errors in the first storage media; and storing a second counter for the number of errors in the second storage media.

Statement 118. An embodiment of the inventive concept includes the method according to statement 114, wherein determining whether the suspect block is predicted to fail responsive to both the precise block-based data and the device-based log data includes determining whether the suspect block is predicted to fail responsive to both the precise block-based data and a selected log data from the first storage type and the second storage type, the selected storage type associated with the suspected block.

Statement 119. An embodiment of the inventive concept includes the method according to statement 114, wherein determining whether the suspect block is predicted to fail responsive to both the precise block-based data and the device-based log data includes determining whether the suspect block is predicted to fail responsive to both the precise block-based data and the device-based log data for only the suspect block.

Statement 120. An embodiment of the inventive concept includes the method according to statement 114, wherein determining whether the suspect block is predicted to fail responsive to both the precise block-based data and the device-based log data includes not determining whether any other block in the first blocks and the second blocks is predicted to fail.

Statement 121. An embodiment of the inventive concept includes the method according to statement 114, further comprising retiring the suspect block based at least in part on the precise block-based data and the device-based log data.

Statement 122. An embodiment of the inventive concept includes the method according to statement 114, wherein storing precise block-based data regarding the errors in the storage device includes storing counters for the number of errors for each block in the first blocks and the second blocks.

Statement 123. An embodiment of the inventive concept includes the method according to statement 122, wherein storing counters for the number of errors for each block in the first blocks and the second blocks includes storing a read error counter, a write error counter, and an erase error counter for each block in the first blocks and the second blocks.

Statement 124. An embodiment of the inventive concept includes the method according to statement 122, wherein storing counters for the number of errors for each block in the first blocks and the second blocks includes storing the counters for the number of errors for each block in the first blocks and the second blocks since the storage device was manufactured.

Statement 125. An embodiment of the inventive concept includes the method according to statement 114, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 126. An embodiment of the inventive concept includes the method according to statement 114, wherein determining whether the suspect block is predicted to fail responsive to both the precise block-based data and the device-based log data includes determining whether the suspect block is predicted to fail responsive to spatially local information for the suspect block.

Statement 127. An embodiment of the inventive concept includes the method according to statement 112, wherein identifying a suspect block in the first blocks and the second blocks responsive to the device-based log data includes deriving approximate block-based data from the device-based log data.

Statement 128. An embodiment of the inventive concept includes the method according to statement 127, wherein deriving approximate block-based data from the device-based log data includes determining average block-based data from the device-based log data.

Statement 129. An embodiment of the inventive concept includes the method according to statement 128, wherein determining the average block-based data from the device-based log data includes determining the average block-based data for a selected storage type from the first storage type and the second storage type, the selected storage type associated with the suspected block.

Statement 130. An embodiment of the inventive concept includes the method according to statement 112, further comprising periodically identifying a new suspect block in the first blocks and the second blocks responsive to the device-based log data.

Statement 131. An embodiment of the inventive concept includes the method according to statement 130, wherein periodically identifying the new suspect block in the first blocks and the second blocks responsive to the device-based log data includes checking the first blocks and the second blocks for the suspect block at regular time intervals.

Statement 132. An embodiment of the inventive concept includes the method according to statement 130, wherein periodically identifying the new suspect block in the first blocks and the second blocks responsive to the device-based log data includes checking the first blocks and the second blocks for the suspect block after a regular number of errors have occurred.

Statement 133. An embodiment of the inventive concept includes a method, comprising:

tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;

storing precise block-based data about the errors in the storage device, the precise block-based data for errors in the storage device including a first counter for a first number of errors in the first storage media and a second counter for a second number of errors in the second storage media; and identifying a suspect block in the first blocks and the second blocks responsive to the precise block-based data.

Statement 134. An embodiment of the inventive concept includes the method according to statement 133, wherein the storage device includes a Solid State Drive (SSD).

Statement 135. An embodiment of the inventive concept includes the method according to statement 133, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 136. An embodiment of the inventive concept includes the method according to statement 133, wherein identifying a suspect block in the first blocks and the second blocks responsive to the precise block-based data includes:

computing a total error count for the suspect block from the precise block-based data; and comparing the total error count with a threshold error count.

Statement 137. An embodiment of the inventive concept includes the method according to statement 136, wherein computing a total error count for the suspect block from the precise block-based data includes:

determining a read error counter, a write error counter, and an erase error counter for the suspect block from the precise block-based data; and totaling the read error counter, the write error counter, and the erase error counter to compute the total error count for the suspect block.

Statement 138. An embodiment of the inventive concept includes the method according to statement 133, further comprising periodically identifying a new suspect block in the first blocks and the second blocks responsive to the precise block-based data.

Statement 139. An embodiment of the inventive concept includes the method according to statement 138, wherein periodically identifying a new suspect block in the first blocks and the second blocks responsive to the precise block-based data includes checking the first blocks and the second blocks for the suspect block at regular time intervals.

Statement 140. An embodiment of the inventive concept includes the method according to statement 138, wherein periodically identifying a new suspect block in the first blocks and the second blocks responsive to the precise block-based data includes checking the first blocks and the second blocks for the suspect block after a regular number of errors have occurred.

Statement 141. An embodiment of the inventive concept includes an article, comprising a non-transitory storage medium, the non-transitory storage medium having stored thereon instructions that, when executed by a machine, result in:

tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;

storing device-based log data about the errors in the storage device, the device-based log data including a first log data for the first storage media and a second log data for the second storage media; and identifying a suspect block in the first blocks and the second blocks responsive to the device-based log data.

Statement 142. An embodiment of the inventive concept includes the article according to statement 141, wherein the storage device includes a Solid State Drive (SSD).

Statement 143. An embodiment of the inventive concept includes the article according to statement 141, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 144. An embodiment of the inventive concept includes the article according to statement 141, wherein storing device-based log data about the errors in the storage device includes:

storing a first most recent set of the errors in the first storage media in the storage device; and storing a second most recent set of the errors in the second storage media in the storage device.

Statement 145. An embodiment of the inventive concept includes the article according to statement 144, wherein:

storing the first most recent set of the errors in the first storage media in the storage device includes discarding a first oldest entry in the first most recent set of the errors when a first new error occurs in the first storage media in the storage device; and storing the second most recent set of the errors in the second storage media in the storage device includes discarding a second oldest entry in the second most recent set of the errors when a second new error occurs in the second storage media in the storage device.

Statement 146. An embodiment of the inventive concept includes the article according to statement 144, wherein the non-transitory storage medium has stored thereon further instructions that, when executed by the machine, result in:

storing precise block-based data regarding the errors in the storage device; and once the suspect block has been identified, determining whether the suspect block is predicted to fail responsive to both the precise block-based data and the device-based log data.

Statement 147. An embodiment of the inventive concept includes the article according to statement 146, wherein determining whether the suspect block is predicted to fail responsive to both the precise block-based data and the device-based log data includes selecting a model to determine whether the suspect block is predicted to fail, the model one of at least a first model for the first storage type and a second model for the second storage type.

Statement 148. An embodiment of the inventive concept includes the article according to statement 146, wherein determining whether the suspect block is predicted to fail responsive to both the precise block-based data and the device-based log data includes determining whether the suspect block is predicted to fail considering a selected storage type associated with the suspect block.

Statement 149. An embodiment of the inventive concept includes the article according to statement 146, wherein storing precise block-based data regarding the errors in the storage device includes:

storing a first counter for the number of errors in the first storage media; and storing a second counter for the number of errors in the second storage media.

Statement 150. An embodiment of the inventive concept includes the article according to statement 146, wherein determining whether the suspect block is predicted to fail responsive to both the precise block-based data and the device-based log data includes determining whether the suspect block is predicted to fail responsive to both the precise block-based data and a selected log data from the first storage type and the second storage type, the selected storage type associated with the suspected block.

Statement 151. An embodiment of the inventive concept includes the article according to statement 146, wherein determining whether the suspect block is predicted to fail responsive to both the precise block-based data and the device-based log data includes determining whether the suspect block is predicted to fail responsive to both the precise block-based data and the device-based log data for only the suspect block.

Statement 152. An embodiment of the inventive concept includes the article according to statement 146, wherein determining whether the suspect block is predicted to fail responsive to both the precise block-based data and the device-based log data includes not determining whether any other block in the first blocks and the second blocks is predicted to fail.

Statement 153. An embodiment of the inventive concept includes the article according to statement 146, wherein the non-transitory storage medium has stored thereon further instructions that, when executed by the machine, result in retiring the suspect block based at least in part on the precise block-based data and the device-based log data.

Statement 154. An embodiment of the inventive concept includes the article according to statement 146, wherein storing precise block-based data regarding the errors in the storage device includes storing counters for the number of errors for each block in the first blocks and the second blocks.

Statement 155. An embodiment of the inventive concept includes the article according to statement 154, wherein storing counters for the number of errors for each block in the first blocks and the second blocks includes storing a read error counter, a write error counter, and an erase error counter for each block in the first blocks and the second blocks.

Statement 156. An embodiment of the inventive concept includes the article according to statement 154, wherein storing counters for the number of errors for each block in the first blocks and the second blocks includes storing the counters for the number of errors for each block in the first blocks and the second blocks since the storage device was manufactured.

Statement 157. An embodiment of the inventive concept includes the article according to statement 146, wherein determining whether the suspect block is predicted to fail responsive to both the precise block-based data and the device-based log data includes applying one of a Random Forest, a Logistic Regression, an Outlier Detection analysis, and an Anomaly Detection analysis to the precise block-based data and the device-based log data.

Statement 158. An embodiment of the inventive concept includes the article according to statement 146, wherein determining whether the suspect block is predicted to fail responsive to both the precise block-based data and the device-based log data includes determining whether the suspect block is predicted to fail responsive to spatially local information for the suspect block.

Statement 159. An embodiment of the inventive concept includes the article according to statement 144, wherein identifying a suspect block in the first blocks and the second blocks responsive to the device-based log data includes deriving approximate block-based data from the device-based log data.

Statement 160. An embodiment of the inventive concept includes the article according to statement 159, wherein deriving approximate block-based data from the device-based log data includes determining average block-based data from the device-based log data.

Statement 161. An embodiment of the inventive concept includes the article according to statement 160, wherein determining the average block-based data from the device-based log data includes determining the average block-based data for a selected storage type from the first storage type and the second storage type, the selected storage type associated with the suspected block.

Statement 162. An embodiment of the inventive concept includes the article according to statement 144, wherein the non-transitory storage medium has stored thereon further instructions that, when executed by the machine, result in periodically identifying a new suspect block in the first blocks and the second blocks responsive to the device-based log data.

Statement 163. An embodiment of the inventive concept includes the article according to statement 162, wherein periodically identifying the new suspect block in the first blocks and the second blocks responsive to the device-based log data includes checking the first blocks and the second blocks for the suspect block at regular time intervals.

Statement 164. An embodiment of the inventive concept includes the article according to statement 162, wherein periodically identifying the new suspect block in the first blocks and the second blocks responsive to the device-based log data includes checking the first blocks and the second blocks for the suspect block after a regular number of errors have occurred.

Statement 165. An embodiment of the inventive concept includes an article, comprising a non-transitory storage medium, the non-transitory storage medium having stored thereon instructions that, when executed by a machine, result in:

tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;

storing precise block-based data about the errors in the storage device, the precise block-based data for errors in the storage device including a first counter for a first number of errors in the first storage media and a second counter for a second number of errors in the second storage media; and identifying a suspect block in the first blocks and the second blocks responsive to the precise block-based data.

Statement 166. An embodiment of the inventive concept includes the article according to statement 165, wherein the storage device includes a Solid State Drive (SSD).

Statement 167. An embodiment of the inventive concept includes the article according to statement 165, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 168. An embodiment of the inventive concept includes the article according to statement 165, wherein identifying a suspect block in the first blocks and the second blocks responsive to the precise block-based data includes:

computing a total error count for the suspect block from the precise block-based data; and comparing the total error count with a threshold error count.

Statement 169. An embodiment of the inventive concept includes the article according to statement 168, wherein computing a total error count for the suspect block from the precise block-based data includes:

determining a read error counter, a write error counter, and an erase error counter for the suspect block from the precise block-based data; and totaling the read error counter, the write error counter, and the erase error counter to compute the total error count for the suspect block.

Statement 170. An embodiment of the inventive concept includes the article according to statement 165, wherein the non-transitory storage medium has stored thereon further instructions that, when executed by the machine, result in periodically identifying a new suspect block in the first blocks and the second blocks responsive to the precise block-based data.

Statement 171. An embodiment of the inventive concept includes the article according to statement 170, wherein periodically identifying a new suspect block in the first blocks and the second blocks responsive to the precise block-based data includes checking the first blocks and the second blocks for the suspect block at regular time intervals.

Statement 172. An embodiment of the inventive concept includes the article according to statement 170, wherein periodically identifying a new suspect block in the first blocks and the second blocks responsive to the precise block-based data includes checking the first blocks and the second blocks for the suspect block after a regular number of errors have occurred.

Statement 173. An embodiment of the inventive concept includes a storage device, comprising:

a first storage media to store a first data, the first storage media of a first storage type, the first storage media organized into at least two first blocks;

a second storage media to store a second data, the second storage media of a second storage type different from the first type, the second storage media organized into at least two second blocks;

a controller to manage reading data from and writing data to the first storage media and the second storage media;

metadata storage to store device-based log data for errors in the storage device, the drive-based log data for errors including a unified log data for the first storage media and the second storage media; and an identification circuit configured to identify a suspect block in the at least two first blocks and the at least two second blocks responsive to the unified log data, wherein a first parameter for the first storage media may be derived from a unified parameter in the unified log data in proportion to a first number of write operations to the first storage media and a second number of read operations to the first storage media, relative to a number of write operations and a number of read operations of the storage device, and wherein a second parameter for the second storage media may be derived from the unified parameter in the unified log data in proportion to a third number of write operations to the second storage media and a fourth number of read operations to the second storage media, relative to the number of write operations and the number of read operations of the storage device.

Statement 174. An embodiment of the inventive concept includes the storage device according to statement 173, wherein:

the first storage type includes first error characteristics; and the second storage type includes second error characteristics, wherein the first error characteristics and the second error characteristics are different.

Statement 175. An embodiment of the inventive concept includes the storage device according to statement 173, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 176. An embodiment of the inventive concept includes the storage device according to statement 173, wherein:

the size of the first storage media includes a first capacity of the first storage media;

the size of the second storage media includes a second capacity of the second storage media; and the size of the storage device includes an overall capacity of the storage device.

Statement 177. An embodiment of the inventive concept includes the storage device according to statement 173, wherein:

the size of the first storage media includes a first number of blocks in the first storage media;

the size of the second storage media includes a second number of blocks in the second storage media; and the size of the storage device includes an overall number of blocks in the storage device.

Statement 178. An embodiment of the inventive concept includes the storage device according to statement 173, wherein:

the first parameter for the first storage media may be derived from the unified parameter in the unified log data in proportion to the first number of write operations to the first storage media and the second number of read operations to the first storage media, relative to the number of write operations and the number of read operations of the storage device, and applying a weight, and wherein the second parameter for the second storage media may be derived from the unified parameter in the unified log data in proportion to the third number of write operations to the second storage media and the fourth number of read operations to the second storage media relative to the number of write operations and the number of read operations of the storage device, and applying the weight.

Statement 179. An embodiment of the inventive concept includes the storage device according to statement 178, wherein the weight includes at least one of a first relative contribution to the unified parameter of write operations to the storage device or a second relative contribution to the unified parameter of read operations to the storage device.

Statement 180. An embodiment of the inventive concept includes the storage device according to statement 173, wherein the metadata storage stores the first number of write operations to the first storage media, the second number of read operations from the first storage media, the third number of write operations to the second storage media, and the fourth number of read operations from the second storage media.

Statement 181. An embodiment of the inventive concept includes the storage device according to statement 173, wherein the storage device includes a Solid State Drive (SSD).

Statement 182. An embodiment of the inventive concept includes the storage device according to statement 173, wherein the unified log data includes:

a first most recent set of the errors in the first storage media in the storage device; and a second most recent set of errors in the second storage media in the storage device.

Statement 183. An embodiment of the inventive concept includes the storage device according to statement 182, wherein:

the first most recent set of the errors in the first storage media includes a first number of errors; and the second most recent set of the errors in the second storage media includes a second number of errors.

Statement 184. An embodiment of the inventive concept includes the storage device according to statement 183, wherein the first number of errors and the second number of errors are in proportion to a first capacity of the first storage media and a second capacity of the second storage media.

Statement 185. An embodiment of the inventive concept includes the storage device according to statement 183, wherein the first number of errors and the second number of errors are in proportion to a first number of blocks in the first storage media and a second number of blocks in the second storage media.

Statement 186. An embodiment of the inventive concept includes the storage device according to statement 182, wherein:

a first oldest entry in the first most recent set of the errors in the first storage media in the storage device is discarded when a first new error in the first storage media occurs; and a second oldest entry in the second most recent set of the errors in the second storage media in the storage device is discarded when a second new error in the second storage media occurs.

Statement 187. An embodiment of the inventive concept includes the storage device according to statement 182, wherein:

the metadata storage is further configured to store precise block-based data regarding the errors in the storage device; and the storage device further comprises a verification circuit configured to determine whether the suspect block is predicted to fail responsive to both the precise block-based data and the unified log data.

Statement 188. An embodiment of the inventive concept includes the storage device according to statement 187, wherein the verification circuit includes a first model for the first storage type and a second model for the second storage type.

Statement 189. An embodiment of the inventive concept includes the storage device according to statement 187, wherein the verification circuit includes a model that may consider a selected storage type associated with the suspect block.

Statement 190. An embodiment of the inventive concept includes the storage device according to statement 187, wherein the verification circuit is executed only for the suspect block.

Statement 191. An embodiment of the inventive concept includes the storage device according to statement 187, wherein the verification circuit is not executed for any block in the first blocks or the second blocks other than the suspect block.

Statement 192. An embodiment of the inventive concept includes the storage device according to statement 187, wherein the verification circuit is configured to retire the suspect block responsive to the precise block-based data and the unified log data.

Statement 193. An embodiment of the inventive concept includes the storage device according to statement 187, wherein the precise block-based data includes counters for the number of errors for each block in the first blocks and the second blocks.

Statement 194. An embodiment of the inventive concept includes the storage device according to statement 193, wherein the precise block-based data includes a first counter for the number of errors in the first storage media and a second counter for the number of errors in the second storage media.

Statement 195. An embodiment of the inventive concept includes the storage device according to statement 193, wherein the counters for the number of errors for each block in the first blocks and the second blocks includes a read error counter, a write error counter, and an erase error counter for each block in the first blocks and the second blocks.

Statement 196. An embodiment of the inventive concept includes the storage device according to statement 193, wherein the precise block-based data includes the counters for the number of errors for each block in the first blocks and the second blocks since the storage device was manufactured.

Statement 197. An embodiment of the inventive concept includes the storage device according to statement 187, wherein the verification circuit implements one of a Random Forest, a Logistic Regression, an Outlier Detection analysis, and an Anomaly Detection analysis to the precise block-based data and the unified log data.

Statement 198. An embodiment of the inventive concept includes the storage device according to statement 187, wherein the identification circuit is configured to identify a suspect block in the first blocks and the second blocks responsive to both the unified log data and the precise block-based data.

Statement 199. An embodiment of the inventive concept includes the storage device according to statement 182, wherein the identification circuit is configured to derive approximate block-based data from the unified log data.

Statement 200. An embodiment of the inventive concept includes the storage device according to statement 199, wherein the identification circuit is configured to determine the approximate block-based data as an average block-based data from the unified log data.

Statement 201. An embodiment of the inventive concept includes the storage device according to statement 200, wherein the identification circuit is configured to determine the approximate block-based data as an average block-based data for a selected storage type from the first storage type and the second storage type, the selected storage type associated with the suspected block.

Statement 202. An embodiment of the inventive concept includes the storage device according to statement 182, wherein the storage device is configured to execute the identification circuit periodically.

Statement 203. An embodiment of the inventive concept includes the storage device according to statement 202, wherein the storage device is configured to execute the identification circuit at regular time intervals.

Statement 204. An embodiment of the inventive concept includes the storage device according to statement 202, wherein the storage device is configured to execute the identification circuit after a regular number of errors have occurred.

Statement 205. An embodiment of the inventive concept includes a storage device, comprising:
 a first storage media to store a first data, the first storage media of a first storage type, the first storage media organized into at least two first blocks;
 a second storage media to store a second data, the second storage media of a second storage type different from the first type, the second storage media organized into at least two second blocks;
 a controller to manage reading data from and writing data to the first storage media and the second storage media;
 metadata storage to store precise block-based data for errors in the storage device, the precise block-based data for errors in the storage device including a first counter for a first number of errors in the first storage media and a second counter for a second number of errors in the second storage media; and
 an identification circuit configured to identify a suspect block in the first blocks and the second blocks responsive to the precise block-based data.

Statement 206. An embodiment of the inventive concept includes the storage device according to statement 205, wherein the storage device includes a Solid State Drive (SSD).

Statement 207. An embodiment of the inventive concept includes the storage device according to statement 205, wherein:
 the first storage type includes a single-level cell (SLC) type; and
 the second storage type includes at least one of a multi-level cell (MLC), triple level cell (TLC), a quad-level cell (QLC), or a penta-level cell (PLC).

Statement 208. An embodiment of the inventive concept includes the storage device according to statement 205, wherein the identification circuit is configured to identify the suspect block responsive to a total error count for the suspect block in the precise block-based data.

Statement 209. An embodiment of the inventive concept includes the storage device according to statement 205, wherein the precise block-based data includes counters for the number of errors for each block in the first blocks and the second blocks.

Statement 210. An embodiment of the inventive concept includes the storage device according to statement 209, wherein the counters for the number of errors for each block in the plurality of blocks includes a read error counter, a write error counter, and an erase error counter for each block in the first blocks and the second blocks.

Statement 211. An embodiment of the inventive concept includes the storage device according to statement 210, wherein the identification circuit is configured to calculate a total error count from the read error counter, the write error counter, and the erase error counter for the suspect block and to compare the total error counter with a threshold.

Statement 212. An embodiment of the inventive concept includes the storage device according to statement 205, wherein the storage device is configured to execute the identification circuit periodically.

Statement 213. An embodiment of the inventive concept includes the storage device according to statement 212, wherein the storage device is configured to execute the identification circuit at regular time intervals.

Statement 214. An embodiment of the inventive concept includes the storage device according to statement 212, wherein the storage device is configured to execute the identification circuit after a regular number of errors have occurred.

Statement 215. An embodiment of the inventive concept includes a method, comprising:
 tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;
 storing unified log data about the errors in the first storage media and the second storage media in the storage device; and
 identifying a suspect block in the first blocks and the second blocks responsive to the unified log data,
 wherein a first parameter for the first storage media may be derived from a unified parameter in the unified log data in proportion to a first number of write operations to the first storage media and a second number of read operations to the first storage media, relative to a number of write operations and a number of read operations of the storage device, and
 wherein a second parameter for the second storage media may be derived from the unified parameter in the unified log data in proportion to a third number of write operations to the second storage media and a fourth number of read operations to the second storage media, relative to the number of write operations and the number of read operations of the storage device.

Statement 216. An embodiment of the inventive concept includes the method according to statement 215, wherein the storage device includes a Solid State Drive (SSD).

Statement 217. An embodiment of the inventive concept includes the method according to statement 215, wherein:
 the first storage type includes a single-level cell (SLC) type; and
 the second storage type includes at least one of a multi-level cell (MLC), triple level cell (TLC), a quad-level cell (QLC), or a penta-level cell (PLC).

Statement 218. An embodiment of the inventive concept includes the method according to statement 215, further comprising:
 deriving the first parameter for the first storage media from the unified parameter in the unified log data in proportion to the first number of write operations to the first storage media and the second number of read operations to the first storage media, relative to the number of write operations and the number of read operations of the storage device, and applying a weight, and deriving the second parameter for the second storage media from the unified parameter in the unified log data in proportion to the first number of write operations to the first storage media and the second number of read operations to the first storage media, relative to the number of write operations and the number of read operations of the storage device, and applying the weight.

Statement 219. An embodiment of the inventive concept includes the method according to statement 218, wherein the weight includes at least one of a first relative contribution to the unified parameter of write operations to the storage device or a second relative contribution to the unified parameter of read operations to the storage device.

Statement 220. An embodiment of the inventive concept includes the method according to statement 215, further comprising storing the first number of write operations to the first storage media, the second number of read operations from the first storage media, the third number of write operations to the second storage media, and the fourth number of read operations from the second storage media.

Statement 221. An embodiment of the inventive concept includes the method according to statement 215, wherein storing unified log data about the errors in the storage device includes:

storing a first most recent set of the errors in the first storage media in the storage device; and storing a second most recent set of the errors in the second storage media in the storage device.

Statement 222. An embodiment of the inventive concept includes the method according to statement 221, wherein:

storing the first most recent set of the errors in the first storage media in the storage device includes discarding a first oldest entry in the first most recent set of the errors when a first new error occurs in the first storage media in the storage device; and storing the second most recent set of the errors in the second storage media in the storage device includes discarding a second oldest entry in the second most recent set of the errors when a second new error occurs in the second storage media in the storage device.

Statement 223. An embodiment of the inventive concept includes the method according to statement 221, further comprising:

storing precise block-based data regarding the errors in the storage device; and once the suspect block has been identified, determining whether the suspect block is predicted to fail responsive to both the precise block-based data and the unified log data.

Statement 224. An embodiment of the inventive concept includes the method according to statement 223, wherein determining whether the suspect block is predicted to fail responsive to both the precise block-based data and the unified log data includes selecting a model to determine whether the suspect block is predicted to fail, the model one of at least a first model for the first storage type and a second model for the second storage type.

Statement 225. An embodiment of the inventive concept includes the method according to statement 223, wherein determining whether the suspect block is predicted to fail responsive to both the precise block-based data and the unified log data includes determining whether the suspect block is predicted to fail considering a selected storage type associated with the suspect block.

Statement 226. An embodiment of the inventive concept includes the method according to statement 223, wherein storing precise block-based data regarding the errors in the storage device includes:

storing a first counter for the number of errors in the first storage media; and storing a second counter for the number of errors in the second storage media.

Statement 227. An embodiment of the inventive concept includes the method according to statement 223, wherein determining whether the suspect block is predicted to fail responsive to both the precise block-based data and the unified log data includes determining whether the suspect block is predicted to fail responsive to both the precise block-based data and a selected log data from the first storage type and the second storage type, the selected storage type associated with the suspected block.

Statement 228. An embodiment of the inventive concept includes the method according to statement 223, wherein determining whether the suspect block is predicted to fail responsive to both the precise block-based data and the unified log data includes determining whether the suspect block is predicted to fail responsive to both the precise block-based data and the unified log data for only the suspect block.

Statement 229. An embodiment of the inventive concept includes the method according to statement 223, wherein determining whether the suspect block is predicted to fail responsive to both the precise block-based data and the unified log data includes not determining whether any other block in the first blocks and the second blocks is predicted to fail.

Statement 230. An embodiment of the inventive concept includes the method according to statement 223, further comprising retiring the suspect block based at least in part on the precise block-based data and the unified log data.

Statement 231. An embodiment of the inventive concept includes the method according to statement 223, wherein storing precise block-based data regarding the errors in the storage device includes storing counters for the number of errors for each block in the first blocks and the second blocks.

Statement 232. An embodiment of the inventive concept includes the method according to statement 231, wherein storing counters for the number of errors for each block in the first blocks and the second blocks includes storing a read error counter, a write error counter, and an erase error counter for each block in the first blocks and the second blocks.

Statement 233. An embodiment of the inventive concept includes the method according to statement 231, wherein storing counters for the number of errors for each block in the first blocks and the second blocks includes storing the counters for the number of errors for each block in the first blocks and the second blocks since the storage device was manufactured.

Statement 234. An embodiment of the inventive concept includes the method according to statement 223, wherein determining whether the suspect block is predicted to fail responsive to both the precise block-based data and the unified log data includes applying one of a Random Forest, a Logistic Regression, an Outlier Detection analysis, and an Anomaly Detection analysis to the precise block-based data and the unified log data.

Statement 235. An embodiment of the inventive concept includes the method according to statement 223, wherein determining whether the suspect block is predicted to fail responsive to both the precise block-based data and the unified log data includes determining whether the suspect block is predicted to fail responsive to spatially local information for the suspect block.

Statement 236. An embodiment of the inventive concept includes the method according to statement 221, wherein identifying a suspect block in the first blocks and the second blocks responsive to the unified log data includes deriving approximate block-based data from the unified log data.

Statement 237. An embodiment of the inventive concept includes the method according to statement 236, wherein deriving approximate block-based data from the unified log data includes determining average block-based data from the unified log data.

Statement 238. An embodiment of the inventive concept includes the method according to statement 237, wherein determining the average block-based data from the unified log data includes determining the average block-based data for a selected storage type from the first storage type and the second storage type, the selected storage type associated with the suspected block.

Statement 239. An embodiment of the inventive concept includes the method according to statement 221, further comprising periodically identifying a new suspect block in the first blocks and the second blocks responsive to the unified log data.

Statement 240. An embodiment of the inventive concept includes the method according to statement 239, wherein periodically identifying the new suspect block in the first blocks and the second blocks responsive to the unified log data includes checking the first blocks and the second blocks for the suspect block at regular time intervals.

Statement 241. An embodiment of the inventive concept includes the method according to statement 239, wherein periodically identifying the new suspect block in the first blocks and the second blocks responsive to the unified log data includes checking the first blocks and the second blocks for the suspect block after a regular number of errors have occurred.

Statement 242. An embodiment of the inventive concept includes a method, comprising:
tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;
storing precise block-based data about the errors in the storage device, the precise block-based data for errors in the storage device including a first counter for a first number of errors in the first storage media and a second counter for a second number of errors in the second storage media; and
identifying a suspect block in the first blocks and the second blocks responsive to the precise block-based data.

Statement 243. An embodiment of the inventive concept includes the method according to statement 242, wherein the storage device includes a Solid State Drive (SSD).

Statement 244. An embodiment of the inventive concept includes the method according to statement 242, wherein:
the first storage type includes a single-level cell (SLC) type; and
the second storage type includes at least one of a multi-level cell (MLC), triple level cell (TLC), a quad-level cell (QLC), or a penta-level cell (PLC).

Statement 245. An embodiment of the inventive concept includes the method according to statement 242, wherein identifying a suspect block in the first blocks and the second blocks responsive to the precise block-based data includes:
computing a total error count for the suspect block from the precise block-based data; and
comparing the total error count with a threshold error count.

Statement 246. An embodiment of the inventive concept includes the method according to statement 245, wherein computing a total error count for the suspect block from the precise block-based data includes:
determining a read error counter, a write error counter, and an erase error counter for the suspect block from the precise block-based data; and
totaling the read error counter, the write error counter, and the erase error counter to compute the total error count for the suspect block.

Statement 247. An embodiment of the inventive concept includes the method according to statement 242, further comprising periodically identifying a new suspect block in the first blocks and the second blocks responsive to the precise block-based data.

Statement 248. An embodiment of the inventive concept includes the method according to statement 247, wherein periodically identifying a new suspect block in the first blocks and the second blocks responsive to the precise block-based data includes checking the first blocks and the second blocks for the suspect block at regular time intervals.

Statement 249. An embodiment of the inventive concept includes the method according to statement 247, wherein periodically identifying a new suspect block in the first blocks and the second blocks responsive to the precise block-based data includes checking the first blocks and the second blocks for the suspect block after a regular number of errors have occurred.

Statement 250. An embodiment of the inventive concept includes an article, comprising a non-transitory storage medium, the non-transitory storage medium having stored thereon instructions that, when executed by a machine, result in:
tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;
storing unified log data about the errors in the first storage media and the second storage media in the storage device; and
identifying a suspect block in the first blocks and the second blocks responsive to the unified log data,
wherein a first parameter for the first storage media may be derived from a unified parameter in the unified log data in proportion to a first number of write operations to the first storage media and a second number of read operations to the first storage media, relative to a number of write operations and a number of read operations of the storage device, and
wherein a second parameter for the second storage media may be derived from the unified parameter in the unified log data in proportion to a third number of write operations to the second storage media and a fourth number of read operations to the second storage media, relative to the number of write operations and the number of read operations of the storage device.

Statement 251. An embodiment of the inventive concept includes the article according to statement 250, wherein the storage device includes a Solid State Drive (SSD).

Statement 252. An embodiment of the inventive concept includes the article according to statement 250, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 253. An embodiment of the inventive concept includes the article according to statement 250, wherein the non-transitory storage medium has stored thereon further instructions that, when executed by the machine, result in:

deriving the first parameter for the first storage media from the unified parameter in the unified log data in proportion to the first number of write operations to the first storage media and the second number of read operations to the first storage media, relative to the number of write operations and the number of read operations of the storage device, and applying a weight, and deriving the second parameter for the second storage media from the unified parameter in the unified log data in proportion to the first number of write operations to the first storage media and the second number of read operations to the first storage media, relative to the number of write operations and the number of read operations of the storage device, and applying the weight.

Statement 254. An embodiment of the inventive concept includes the article according to statement 253, wherein the weight includes at least one of a first relative contribution to the unified parameter of write operations to the storage device or a second relative contribution to the unified parameter of read operations to the storage device.

Statement 255. An embodiment of the inventive concept includes the article according to statement 250, wherein the non-transitory storage medium has stored thereon further instructions that, when executed by the machine, result in storing the first number of write operations to the first storage media, the second number of read operations from the first storage media, the third number of write operations to the second storage media, and the fourth number of read operations from the second storage media.

Statement 256. An embodiment of the inventive concept includes the article according to statement 250, wherein storing unified log data about the errors in the storage device includes:

storing a first most recent set of the errors in the first storage media in the storage device; and storing a second most recent set of the errors in the second storage media in the storage device.

Statement 257. An embodiment of the inventive concept includes the article according to statement 256, wherein:

storing the first most recent set of the errors in the first storage media in the storage device includes discarding a first oldest entry in the first most recent set of the errors when a first new error occurs in the first storage media in the storage device; and storing the second most recent set of the errors in the second storage media in the storage device includes discarding a second oldest entry in the second most recent set of the errors when a second new error occurs in the second storage media in the storage device.

Statement 258. An embodiment of the inventive concept includes the article according to statement 256, wherein the non-transitory storage medium has stored thereon further instructions that, when executed by the machine, result in:

storing precise block-based data regarding the errors in the storage device; and once the suspect block has been identified, determining whether the suspect block is predicted to fail responsive to both the precise block-based data and the unified log data.

Statement 259. An embodiment of the inventive concept includes the article according to statement 258, wherein determining whether the suspect block is predicted to fail responsive to both the precise block-based data and the unified log data includes selecting a model to determine whether the suspect block is predicted to fail, the model one of at least a first model for the first storage type and a second model for the second storage type.

Statement 260. An embodiment of the inventive concept includes the article according to statement 258, wherein determining whether the suspect block is predicted to fail responsive to both the precise block-based data and the unified log data includes determining whether the suspect block is predicted to fail considering a selected storage type associated with the suspect block.

Statement 261. An embodiment of the inventive concept includes the article according to statement 258, wherein storing precise block-based data regarding the errors in the storage device includes:

storing a first counter for the number of errors in the first storage media; and storing a second counter for the number of errors in the second storage media.

Statement 262. An embodiment of the inventive concept includes the article according to statement 258, wherein determining whether the suspect block is predicted to fail responsive to both the precise block-based data and the unified log data includes determining whether the suspect block is predicted to fail responsive to both the precise block-based data and a selected log data from the first storage type and the second storage type, the selected storage type associated with the suspected block.

Statement 263. An embodiment of the inventive concept includes the article according to statement 258, wherein determining whether the suspect block is predicted to fail responsive to both the precise block-based data and the unified log data includes determining whether the suspect block is predicted to fail responsive to both the precise block-based data and the unified log data for only the suspect block.

Statement 264. An embodiment of the inventive concept includes the article according to statement 258, wherein determining whether the suspect block is predicted to fail responsive to both the precise block-based data and the unified log data includes not determining whether any other block in the first blocks and the second blocks is predicted to fail.

Statement 265. An embodiment of the inventive concept includes the article according to statement 258, wherein the non-transitory storage medium has stored thereon further instructions that, when executed by the machine, result in retiring the suspect block based at least in part on the precise block-based data and the unified log data.

Statement 266. An embodiment of the inventive concept includes the article according to statement 258, wherein storing precise block-based data regarding the errors in the storage device includes storing counters for the number of errors for each block in the first blocks and the second blocks.

Statement 267. An embodiment of the inventive concept includes the article according to statement 266, wherein storing counters for the number of errors for each block in the first blocks and the second blocks includes storing a read error counter, a write error counter, and an erase error counter for each block in the first blocks and the second blocks.

Statement 268. An embodiment of the inventive concept includes the article according to statement 266, wherein storing counters for the number of errors for each block in the first blocks and the second blocks includes storing the counters for the number of errors for each block in the first blocks and the second blocks since the storage device was manufactured.

Statement 269. An embodiment of the inventive concept includes the article according to statement 258, wherein determining whether the suspect block is predicted to fail responsive to both the precise block-based data and the unified log data includes applying one of a Random Forest, a Logistic Regression, an Outlier Detection analysis, and an Anomaly Detection analysis to the precise block-based data and the unified log data.

Statement 270. An embodiment of the inventive concept includes the article according to statement 258, wherein determining whether the suspect block is predicted to fail responsive to both the precise block-based data and the unified log data includes determining whether the suspect block is predicted to fail responsive to spatially local information for the suspect block.

Statement 271. An embodiment of the inventive concept includes the article according to statement 256, wherein identifying a suspect block in the first blocks and the second blocks responsive to the unified log data includes deriving approximate block-based data from the unified log data.

Statement 272. An embodiment of the inventive concept includes the article according to statement 271, wherein deriving approximate block-based data from the unified log data includes determining average block-based data from the unified log data.

Statement 273. An embodiment of the inventive concept includes the article according to statement 272, wherein determining the average block-based data from the unified log data includes determining the average block-based data for a selected storage type from the first storage type and the second storage type, the selected storage type associated with the suspected block.

Statement 274. An embodiment of the inventive concept includes the article according to statement 256, wherein the non-transitory storage medium has stored thereon further instructions that, when executed by the machine, result in periodically identifying a new suspect block in the first blocks and the second blocks responsive to the unified log data.

Statement 275. An embodiment of the inventive concept includes the article according to statement 274, wherein periodically identifying the new suspect block in the first blocks and the second blocks responsive to the unified log data includes checking the first blocks and the second blocks for the suspect block at regular time intervals.

Statement 276. An embodiment of the inventive concept includes the article according to statement 274, wherein periodically identifying the new suspect block in the first blocks and the second blocks responsive to the unified log data includes checking the first blocks and the second blocks for the suspect block after a regular number of errors have occurred.

Statement 277. An embodiment of the inventive concept includes an article, comprising a non-transitory storage medium, the non-transitory storage medium having stored thereon instructions that, when executed by a machine, result in:

tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;

storing precise block-based data about the errors in the storage device, the precise block-based data for errors in the storage device including a first counter for a first number of errors in the first storage media and a second counter for a second number of errors in the second storage media; and identifying a suspect block in the first blocks and the second blocks responsive to the precise block-based data.

Statement 278. An embodiment of the inventive concept includes the article according to statement 277, wherein the storage device includes a Solid State Drive (SSD).

Statement 279. An embodiment of the inventive concept includes the article according to statement 277, wherein:

the first storage type includes a single-level cell (SLC) type; and the second storage type includes at least one of a multi-level cell (MLC), triple level cell (TLC), a quad-level cell (QLC), or a penta-level cell (PLC).

Statement 280. An embodiment of the inventive concept includes the article according to statement 277, wherein identifying a suspect block in the first blocks and the second blocks responsive to the precise block-based data includes:

computing a total error count for the suspect block from the precise block-based data; and comparing the total error count with a threshold error count.

Statement 281. An embodiment of the inventive concept includes the article according to statement 280, wherein computing a total error count for the suspect block from the precise block-based data includes:

determining a read error counter, a write error counter, and an erase error counter for the suspect block from the precise block-based data; and totaling the read error counter, the write error counter, and the erase error counter to compute the total error count for the suspect block.

Statement 282. An embodiment of the inventive concept includes the article according to statement 277, wherein the non-transitory storage medium has stored thereon further instructions that, when executed by the machine, result in periodically identifying a new suspect block in the first blocks and the second blocks responsive to the precise block-based data.

Statement 283. An embodiment of the inventive concept includes the article according to statement 282, wherein periodically identifying a new suspect block in the first blocks and the second blocks responsive to the precise block-based data includes checking the first blocks and the second blocks for the suspect block at regular time intervals.

Statement 284. An embodiment of the inventive concept includes the article according to statement 282, wherein periodically identifying a new suspect block in the first blocks and the second blocks responsive to the precise block-based data includes checking the first blocks and the second blocks for the suspect block after a regular number of errors have occurred.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:
a first storage media to store a first data, the first storage media of a first storage type, the first storage media organized into at least two first blocks;
a second storage media to store a second data, the second storage media of a second storage type different from the first type, the second storage media organized into at least two second blocks;
a controller to manage reading data from and writing data to the first storage media and the second storage media;
metadata storage to store a device-based log data for errors in the storage device, the device-based log data including a first log data for the first storage media and a second log data for the second storage media; and
an identification circuit configured to identify a suspect block in the at least two first blocks and the at least two second blocks responsive to the device-based log data.

2. The storage device according to claim 1, wherein:
the first storage type includes first error characteristics; and
the second storage type includes second error characteristics, wherein the first error characteristics and the second error characteristics are different.

3. The storage device according to claim 1, wherein the device-based log data further includes:
a first most recent set of the errors in the first storage media in the storage device; and
a second most recent set of errors in the second storage media in the storage device.

4. The storage device according to claim 3, wherein:
the first most recent set of the errors in the first storage media includes a first number of errors; and
the second most recent set of the errors in the second storage media includes a second number of errors.

5. The storage device according to claim 4, wherein the first number of errors and the second number of errors are in proportion to a first capacity of the first storage media and a second capacity of the second storage media.

6. The storage device according to claim 3, wherein:
the metadata storage is further configured to store a precise block-based data regarding the errors in the storage device; and
the storage device further comprises a verification circuit configured to determine whether the suspect block is predicted to fail responsive to both the precise block-based data and the device-based log data.

7. The storage device according to claim 6, wherein the verification circuit includes a first model for the first storage type and a second model for the second storage type.

8. The storage device according to claim 6, wherein the verification circuit includes a model that may consider a selected storage type associated with the suspect block.

9. The storage device according to claim 3, wherein the identification circuit is configured to derive approximate block-based data as an average block-based data from the device-based log data for a selected storage type from the first storage type and the second storage type, the selected storage type associated with the suspected block.

10. A method, comprising:
tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;
storing device-based log data about the errors in the storage device, the device-based log data including a first log data for the first storage media and a second log data for the second storage media; and
identifying a suspect block in the first blocks and the second blocks responsive to the device-based log data.

11. The method according to claim 10, wherein storing device-based log data about the errors in the storage device includes:
storing a first most recent set of the errors in the first storage media in the storage device; and
storing a second most recent set of the errors in the second storage media in the storage device.

12. The method according to claim 11, further comprising:
storing precise block-based data regarding the errors in the storage device; and
once the suspect block has been identified, determining whether the suspect block is predicted to fail responsive to both the precise block-based data and the device-based log data.

13. The method according to claim 12, wherein determining whether the suspect block is predicted to fail responsive to both the precise block-based data and the device-based log data includes selecting a model to determine whether the suspect block is predicted to fail, the model one of at least a first model for the first storage type and a second model for the second storage type.

14. The method according to claim 12, wherein determining whether the suspect block is predicted to fail responsive to both the precise block-based data and the device-based log data includes determining whether the suspect block is predicted to fail considering a selected storage type associated with the suspect block.

15. The method according to claim 12, wherein determining whether the suspect block is predicted to fail responsive to both the precise block-based data and the device-based log data includes determining whether the suspect block is predicted to fail responsive to both the precise block-based data and a selected log data from the first storage type and the second storage type, the selected storage type associated with the suspected block.

16. The method according to claim 11, wherein identifying a suspect block in the first blocks and the second blocks responsive to the device-based log data includes deriving approximate block-based data from the device-based log data.

17. The method according to claim 16, wherein deriving approximate block-based data from the device-based log data includes determining average block-based data from the device-based log data.

18. The method according to claim 17, wherein determining the average block-based data from the device-based log data includes determining the average block-based data for a selected storage type from the first storage type and the second storage type, the selected storage type associated with the suspected block.

19. An article, comprising a non-transitory storage medium, the non-transitory storage medium having stored thereon instructions that, when executed by a machine, result in:
- tracking errors in a storage device, the storage device including a first storage media to store a first data and a second storage media to store a second data, the first storage media of a first storage type, the first storage media organized into at least two first blocks, the second storage media of a second storage type different from the first type, the second storage media organized into at least two second blocks;
- storing device-based log data about the errors in the storage device, the device-based log data including a first log data for the first storage media and a second log data for the second storage media; and
- identifying a suspect block in the first blocks and the second blocks responsive to the device-based log data.

20. The article according to claim 19, wherein storing device-based log data about the errors in the storage device includes:
- storing a first most recent set of the errors in the first storage media in the storage device; and
- storing a second most recent set of the errors in the second storage media in the storage device.

* * * * *